Oct. 14, 1941.    H. L. PITMAN    2,258,714
COMBINED TYPEWRITING AND COMPUTING MACHINE
Filed Sept. 28, 1935    12 Sheets-Sheet 1

INVENTOR:
Henry L. Pitman
BY B.C. Stickney
ATTORNEY.

Oct. 14, 1941. H. L. PITMAN 2,258,714
COMBINED TYPEWRITING AND COMPUTING MACHINE
Filed Sept. 28, 1935 12 Sheets-Sheet 2

INVENTOR:
Henry L. Pitman
BY D. C. Stickney
ATTORNEY.

Oct. 14, 1941.          H. L. PITMAN          2,258,714
COMBINED TYPEWRITING AND COMPUTING MACHINE
Filed Sept. 28, 1935          12 Sheets-Sheet 4

INVENTOR:
Henry L. Pitman
BY D. C. Stickney
ATTORNEY.

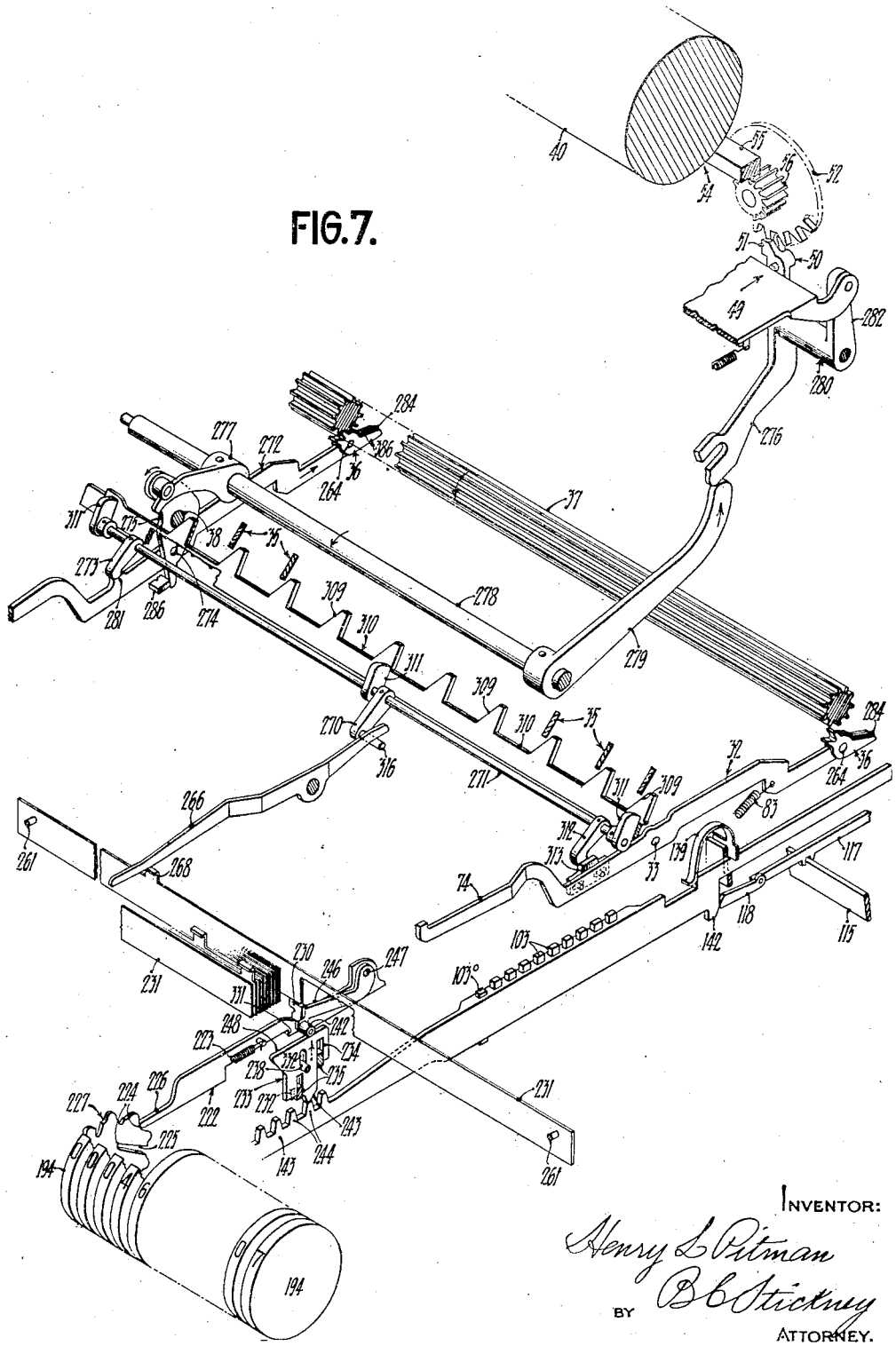

Oct. 14, 1941.　　　H. L. PITMAN　　　2,258,714
COMBINED TYPEWRITING AND COMPUTING MACHINE
Filed Sept. 28, 1935　　12 Sheets-Sheet 6
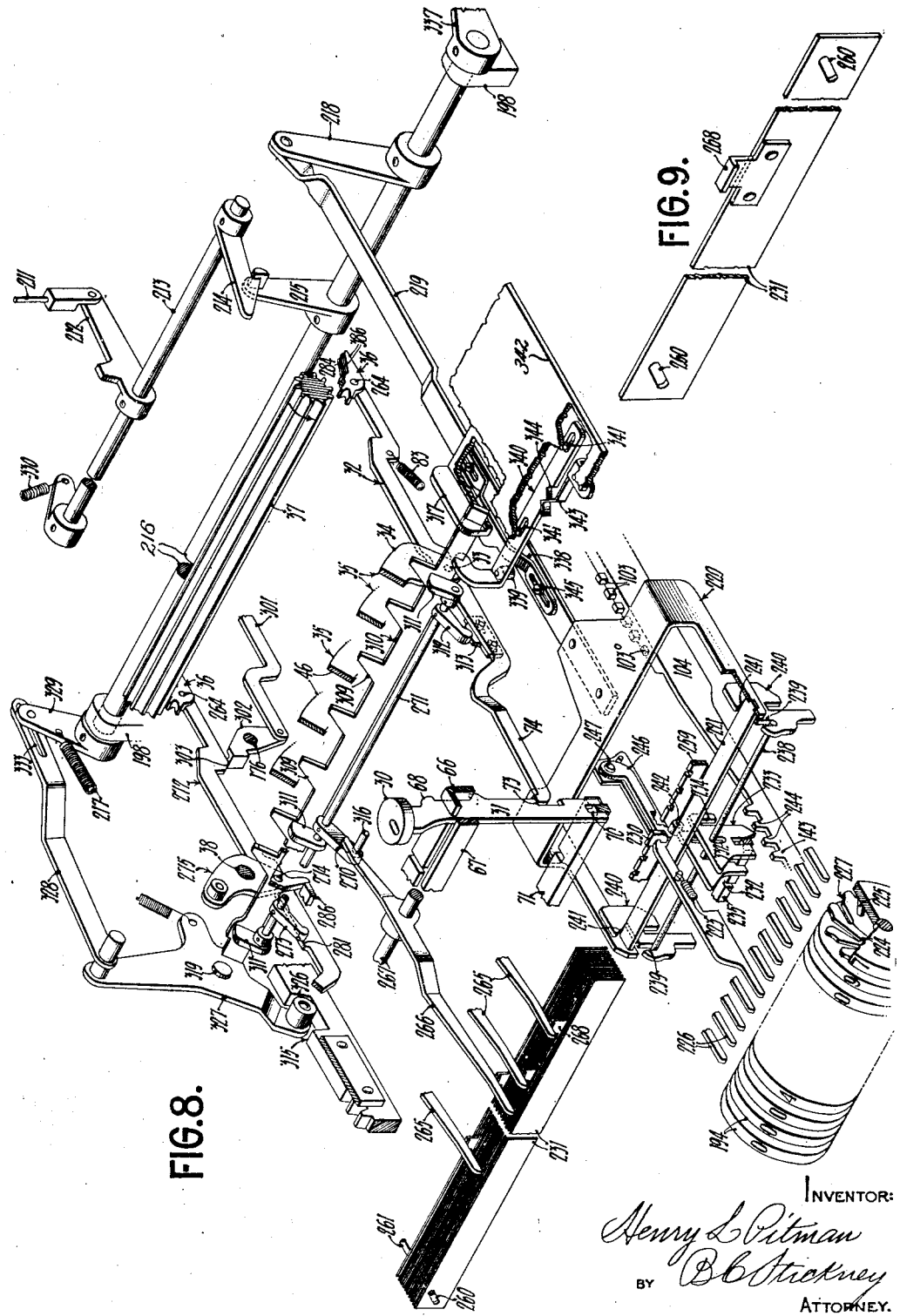
INVENTOR:
Henry L. Pitman
BY B. C. Stickney
ATTORNEY.

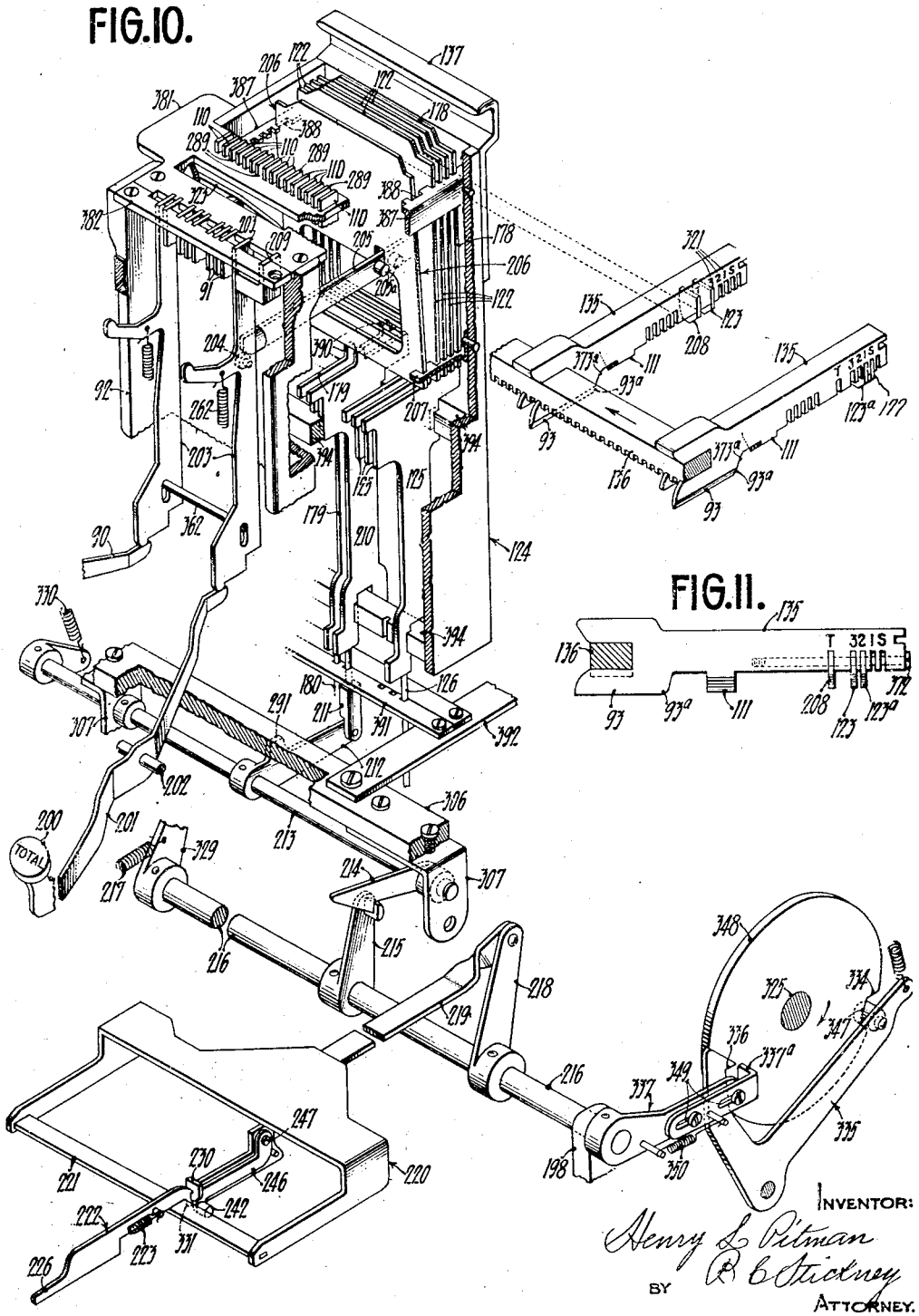

Oct. 14, 1941.   H. L. PITMAN   2,258,714
COMBINED TYPEWRITING AND COMPUTING MACHINE
Filed Sept. 28, 1935   12 Sheets-Sheet 8
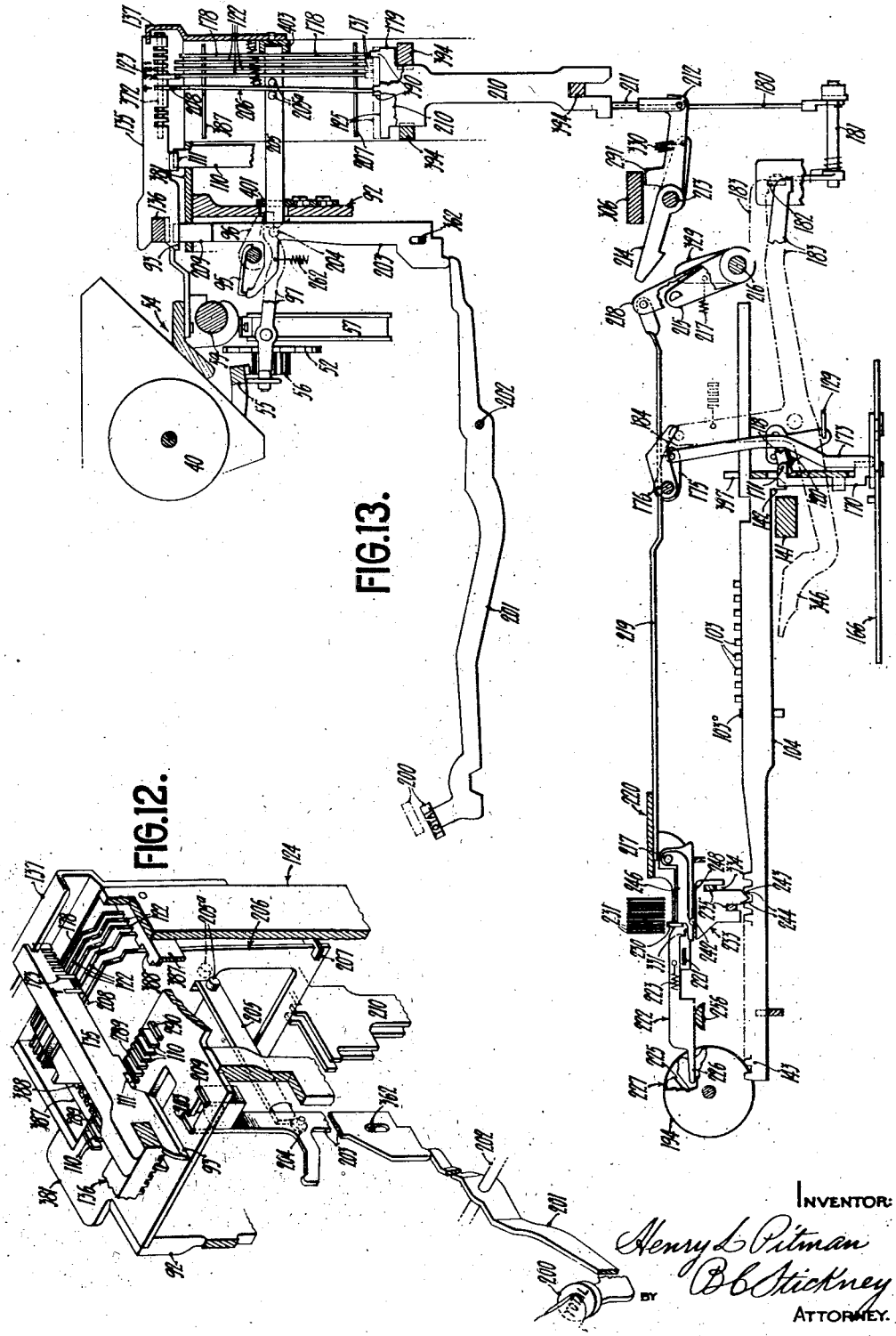
INVENTOR:
Henry L. Pitman
BY B. C. Stickney
ATTORNEY.

Oct. 14, 1941. H. L. PITMAN 2,258,714
COMBINED TYPEWRITING AND COMPUTING MACHINE
Filed Sept. 28, 1935 12 Sheets-Sheet 9
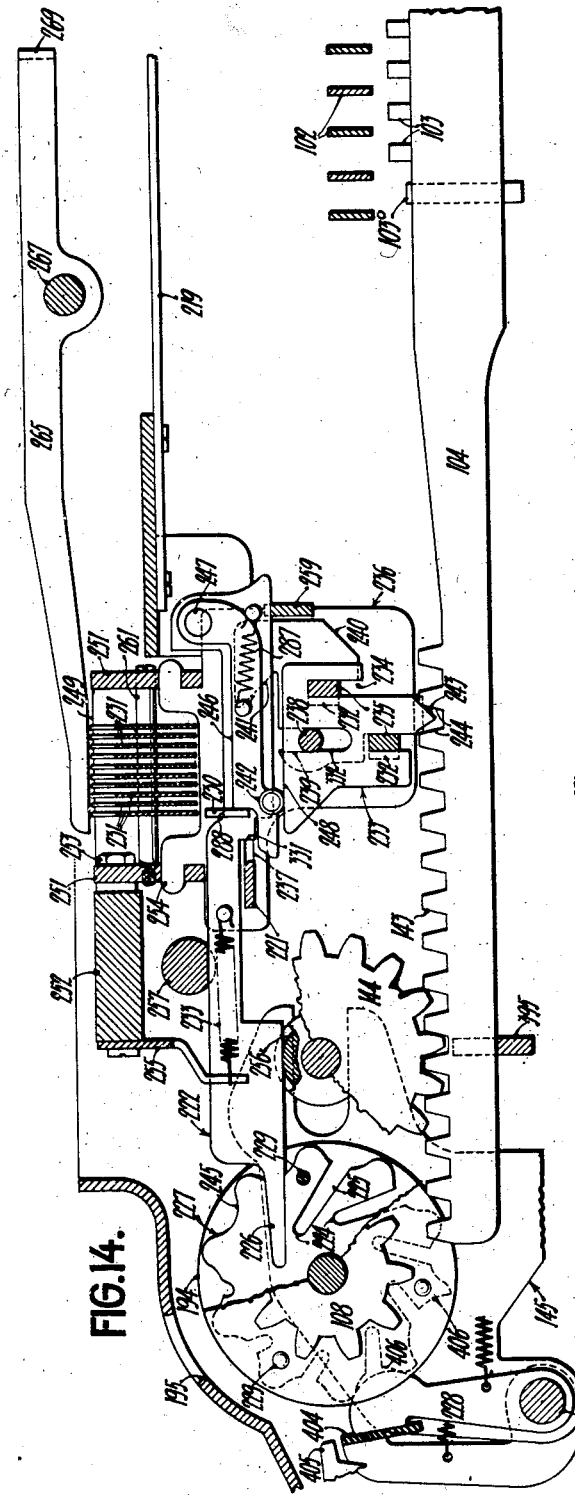
INVENTOR:
Henry L. Pitman
B. C. Stickney
BY
ATTORNEY.

Oct. 14, 1941.                H. L. PITMAN                2,258,714
                COMBINED TYPEWRITING AND COMPUTING MACHINE
                    Filed Sept. 28, 1935      12 Sheets-Sheet 10

INVENTOR:
Henry L. Pitman
B C Stickney
BY
ATTORNEY.

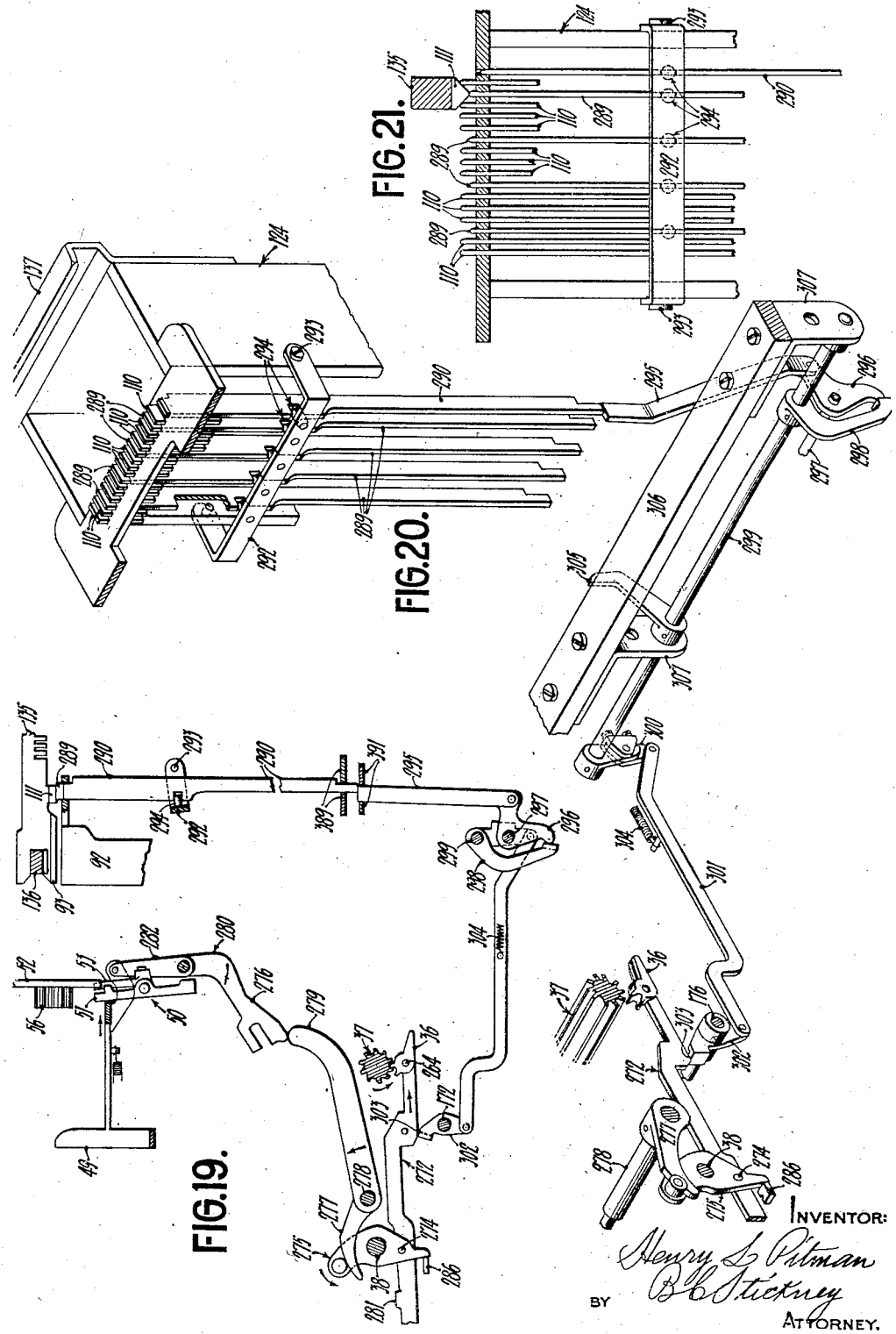

Oct. 14, 1941.    H. L. PITMAN    2,258,714
COMBINED TYPEWRITING AND COMPUTING MACHINE
Filed Sept. 28, 1935    12 Sheets-Sheet 12
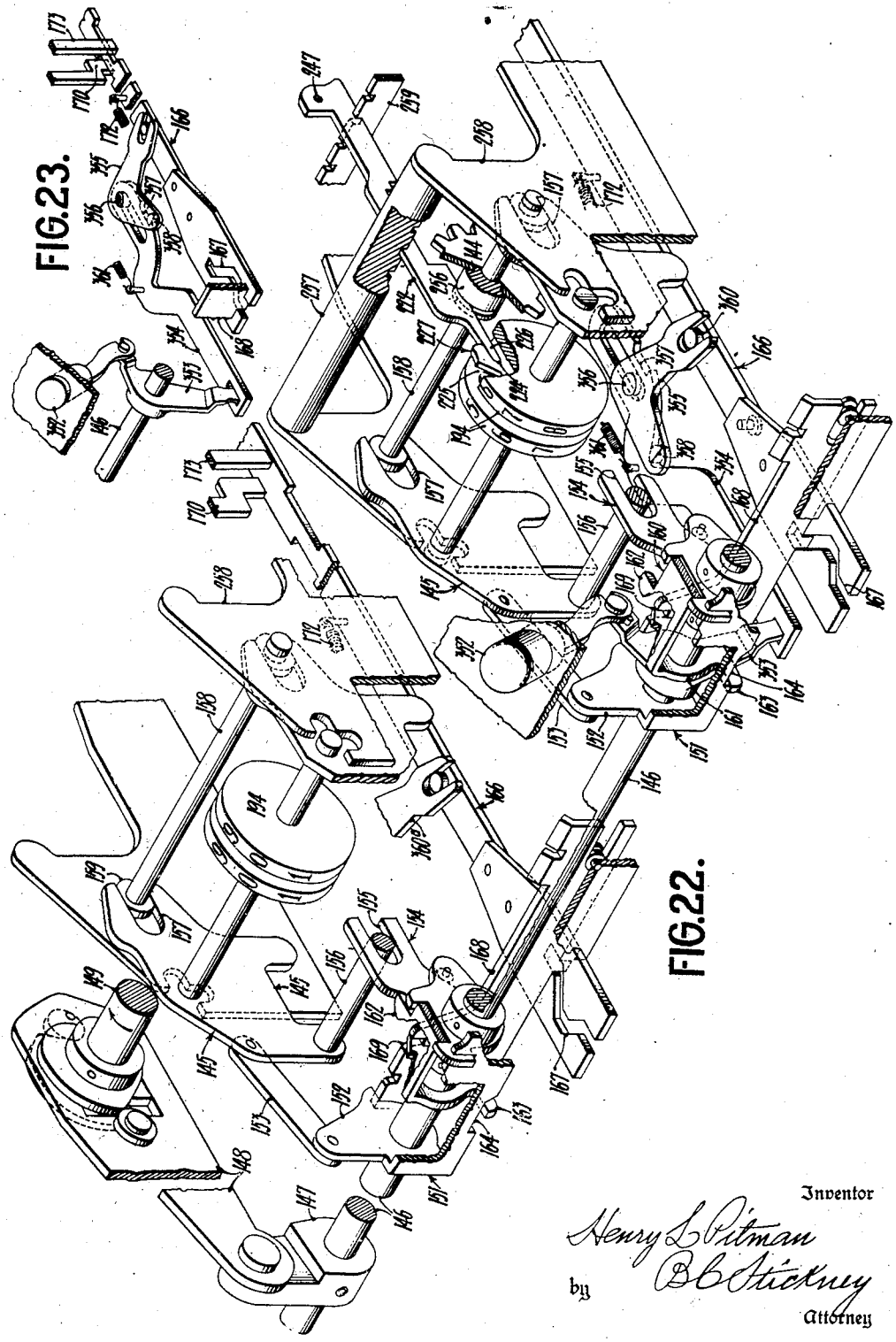
Inventor
Henry L. Pitman
B. C. Stickney
by       Attorney Patented Oct. 14, 1941

2,258,714

UNITED STATES PATENT OFFICE 2,258,714

COMBINED TYPEWRITING AND COMPUTING MACHINE

Henry L. Pitman, Hartford, Conn., assignor to Underwood Elliott Fisher Company, New York, N. Y., a corporation of Delaware Application September 28, 1935, Serial No. 42,611

34 Claims. (Cl. 235—60)

This invention relates to combined typewriting and computing machines of the class in which numeral type-keys of a typewriter are operable for causing an amount to be registered in computing wheels and are also operable for transcribing the total in the computing wheels, to a work-sheet on the typewriter-platen.

An object of the invention is to provide a reliable, durable, and mechanically simple total-taking mechanism whereby, upon pressing a total key, the numeral-types of the typewriter mechanism will be selected and actuated automatically to transcribe the registered total from the computing wheels.

The invention deals particularly with provision of a total-taking mechanism for a combined typewriting and computing machine of the Underwood-Hanson class, exemplified in my U. S. Patent 1,927,951, dated September 26, 1933. The invention is in the nature of an improvement over the application of Kurowski, Serial No. 660,830, filed March 15, 1933, relating to total-taking mechanism for a machine of the Underwood-Hanson class.

In the Underwood-Hanson machine, a typewriter-unit surmounts a computing base containing computing wheels and reciprocable drivers therefor. By means of an indexing mechanism, an amount is set up in said drivers through operation of the numeral-typewriter keys to print the amount, the typewriter-carriage cooperating to index said amount in denominational order in the drivers. Following the printing and indexing of the amount, a general operator in the computing base is cycled for actuating the indexed drivers, and thereby registering the indexed amount in the computing wheels.

For automatically operating the typewriter numeral-types for transcribing a total from the computing wheels, a toothed power-shaft is provided in the typewriter. Engagement of the numeral type-actions with the toothed power-shaft is under the control of computing-wheel-engaging total-reading feelers, in that the latter, through their total-reading positions relative to the computing wheels pre-select the numeral-types to be operated for printing the total. Connection of said numeral type-actions with the power-shaft is also under the denominational control of the typewriter-carriage, in order that the latter, as it passes through the total-typing zone, may bring said numeral type-actions selected by the total-reading feelers, into engagement with the power-shaft in denominational order. Operation of the total-key causes the carriage to be tabulated to the highest denomination in the total-typing zone to bring into play novel total-printing control means to initiate the automatic total printing.

A plurality of sets of computing wheels and sets of indexable drivers therefor are used, and a total may be automatically printed from a given set of computing wheels. Operation of the typewriter numeral-types to print said total may cause the amount of the total to be indexed in the set of drivers for the computing wheels from which the total is transcribed, and in the set of drivers for another set of computing wheels. The general operator is then cycled for clearing the first set of wheels by subtracting the total therefrom, and for adding or transferring said total to said other set of wheels.

The computing wheels in the computing base may subtract directly in that they are rotatable in one direction for addition, and reversely for subtraction. The computing wheels in the computing base are normally disengaged from their indexable drivers and are brought into engagement with the latter through operation of respective state-controllers. Each state-controller has associated therewith a master train operable by a zone tappet on the typewriter carriage to adjust the state-controller from a normal neutral condition to an additive or subtractive condition. Novel features, related to the total-printing mechanism, are associated with the state-controlling mechanism in order that, when the total-key is operated, the set of computing wheels, in the computing base, from which the total is transcribed will be operated subtractively, while the other set of wheels to which the total is transferred will be operated additively.

The set of computing wheels, in the computing base, from which a total is to be automatically transcribed may be used for cross-computing, in that the individually accumulated items may be distributed over more than one column across the work-sheet, and the total printed in still another column. A further feature of invention pertains to prevention of printing the total in the wrong column and resides in provision, in the aforementioned total printing control means, whereby operation of the total-key and the resulting aforementioned advance of the carriage to a computing zone will not result in automatic total-printing unless said zone corresponds to a total-printing column. To this end said total-printing-control means may include a tappet which may be set on the carriage to co-act with companion devices, to bring the total-reading and type-selecting mechanism into use only for the total printing column and not for other columns, by operation of the total key.

The computing wheels from which a total is transcribed may also compute vertically by printing the several items and their total in one column of the work-sheet. Since in such case, the total-printing control tappet is set with reference to said one column, the invention further makes provision whereby, when the carriage is positioned in the column for the purpose of item-printing, operation of the total-printing mechanism through inadvertently pressing the total-key will be silenced or blocked.

The carriage being advanced, by operation of the total key, to the highest denomination of the total-printing zone, means are provided for automatically spacing the carriage, under control of the computing wheels and by means of the typewriter-escapement, from said highest denomination to the first significant figure denomination of the total, it being noted that the total may have one or more denominations less than the capacity of said total printing one. Novel means, whereby the "0"-registering computing wheels ahead of the first-significant-figure register-wheel will cause the carriage-escapement to be operated consonantly with silencing operation of the "0"-type, and whereby, as a result of printing the first significant figure of the total, the "0"-type will be rendered potentially effective for printing any "0" after said first significant figure, operate mechanically and reliably, as distinguished from electrically operated devices. Provision, of mechanically operating means, is also made for punctuating the printed total-amount, as by spacing the carriage to set off the cents from the dollars denominations, and the hundreds and the thousands denominations. The total-reading means, the type-selecting means, and the means for connecting the selected types to the power shaft also operate mechanically.

Other computing wheels, outside of the computing base, co-act with a master-wheel mechanism which translates the strokes of the typewriter-numeral-types into entries into said latter computing wheels seriatim as the typewriter carriage advances through a computing one. It is a further feature of the invention that while the numeral type-actions are being automatically operated to transcribe a total from a set of computing wheels in the computing base, said type-actions may also actuate the master-wheel mechanism to transfer the total to the master-wheel-operated set of computing wheels.

The invention also makes provision for use of a sub-total key mechanism, operation of which, in connection with an operation of the total-key, determines non-rotation, at the general-operator cycle, of the computing wheels from which the total is transcribed. Said sub-total key mechanism may also be used as a throw-off key mechanism for preventing rotation of said computing wheels under certain conditions of item accumulation in another set of wheels.

The total-key may be used also as a key for tabulating the carriage for certain columns, for example, a series of cross-adding columns, without causing automatic total-printing.

Novel structural features conduce to simplification, and economy of manufacture and servicing of the machine and its total-printing mechanism, to accurate operation, and to ease of adjustment for different kinds of accounting work.

Other features and advantages will hereinafter appear.

In the accompanying drawings:

Figure 7 is a perspective of the parts for operating the space-key in response to a "0" reading.

Figure 8 is a perspective showing the parts conditioned, by printing the first significant figure of a total, to render the "0" type actuator potentially effective.

Figure 9 is a perspective of one of the digit blades of the type-selecting means.

Figure 10 is a perspective showing the master-control trains for selecting a register, initiating a total printing operation, and state setting.

Figure 11 is a view of a computing zone tappet block, arranged for transferring the total from one register to another computing base register.

Figure 12 is a perspective of carriage-controlled parts of the total-printing-actuating mechanism, and shows how operation of the latter may be prevented while the carriage is traversing a computing zone for an item-printing operation.

Figure 13 is a side sectional view showing the total-printing mechanism and certain state-controlling devices released by advance of the carriage through operating the total-key.

Figure 14 is a sectional view of the computing base showing computing wheels, drivers and the released total reading and type-selecting-mechanism.

Figure 15 is a view showing details of certain parts of Figure 14.

Figure 16 is a view showing the relation of the parts, of Figure 15, before operation of the total-key.

Figure 19 is a side view showing operation of the carriage-escapement-operating train for punctuating the total.

Figure 20 is a perspective showing the carriage-escapement-operating train and its connection to a set of punctuation jacks traversable by a carriage-tappet.

Figure 21 is a fragmentary front view showing the punctuation-jacks interspaced with denominational jacks controlled by said carriage-tappet.

Figure 22 is a perspective representing the total printing register and another computing base register, part of state controlling means, and throw-off key mechanism for each register.

Figure 23 is a perspective showing a throw-off or sub-total key mechanism operated to silence the companion state controller for a sub-total.

Figure 1:
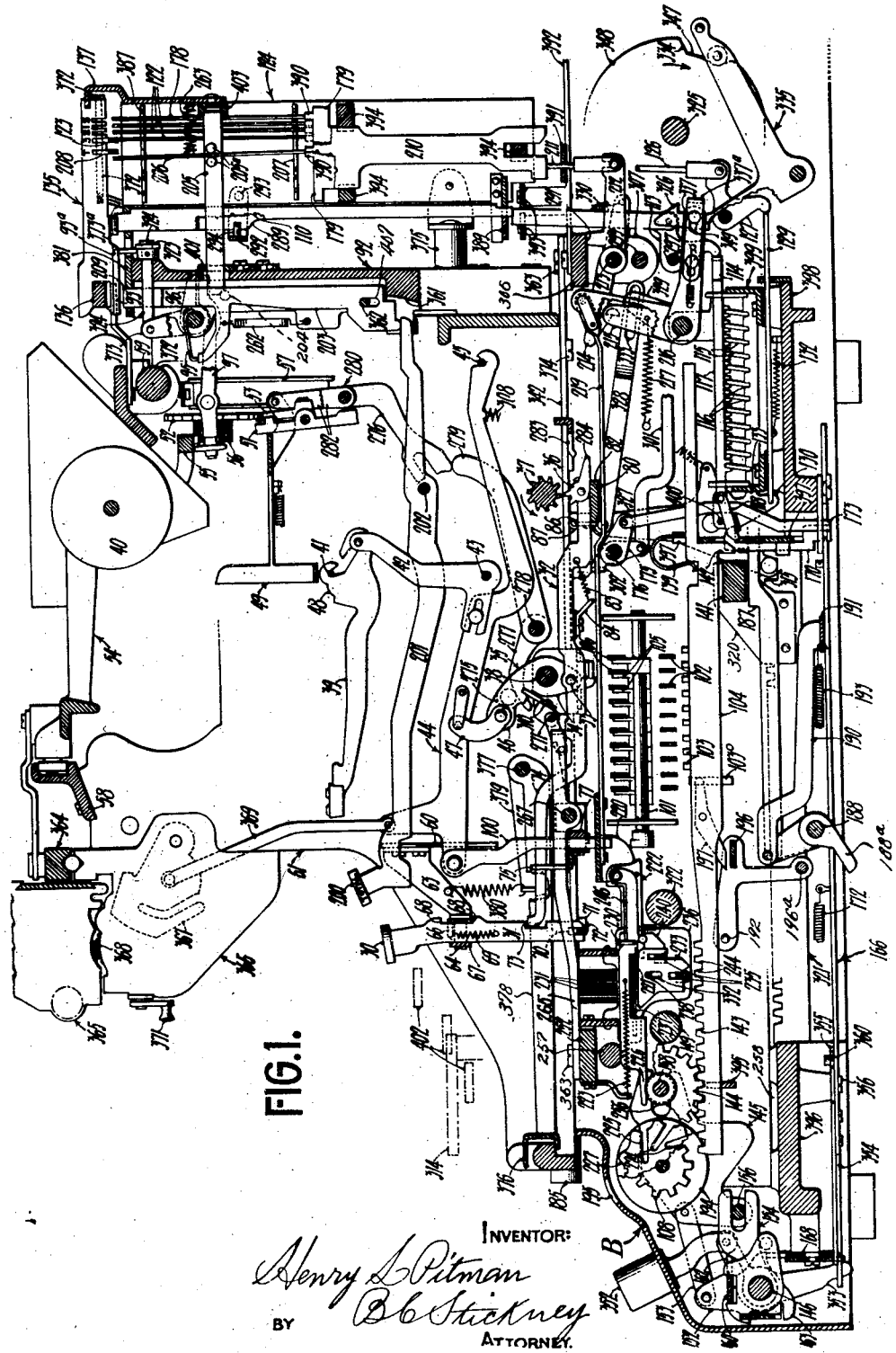
Figure 1 is a sectional side elevation of the combined typewriting and computing machine embodying the novel total printing mechanism.
Figure 2:
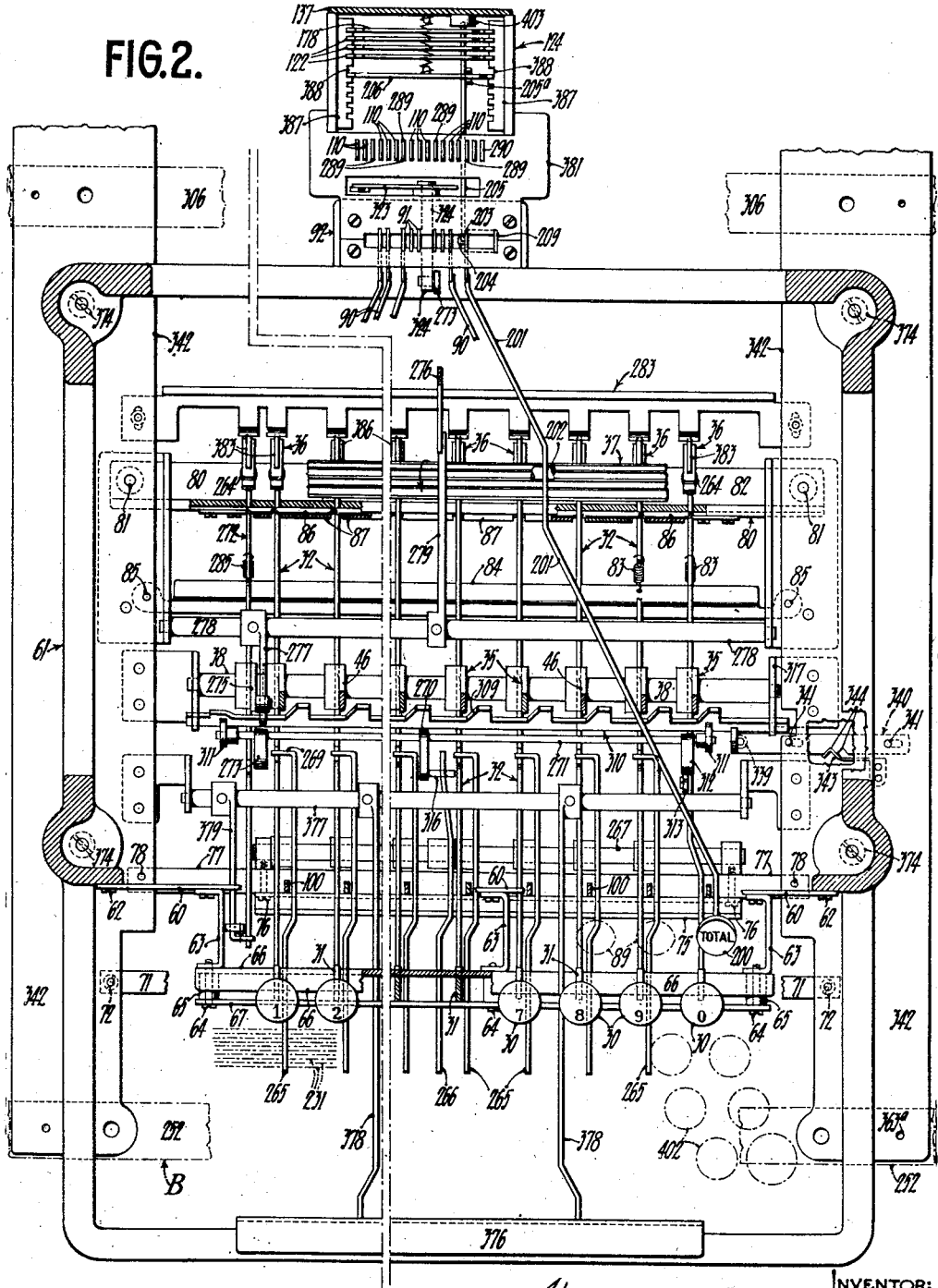
Figure 2 is a plan of the typewriter showing principally the devices for operating the numeral types and space key by power.
Figure 6:
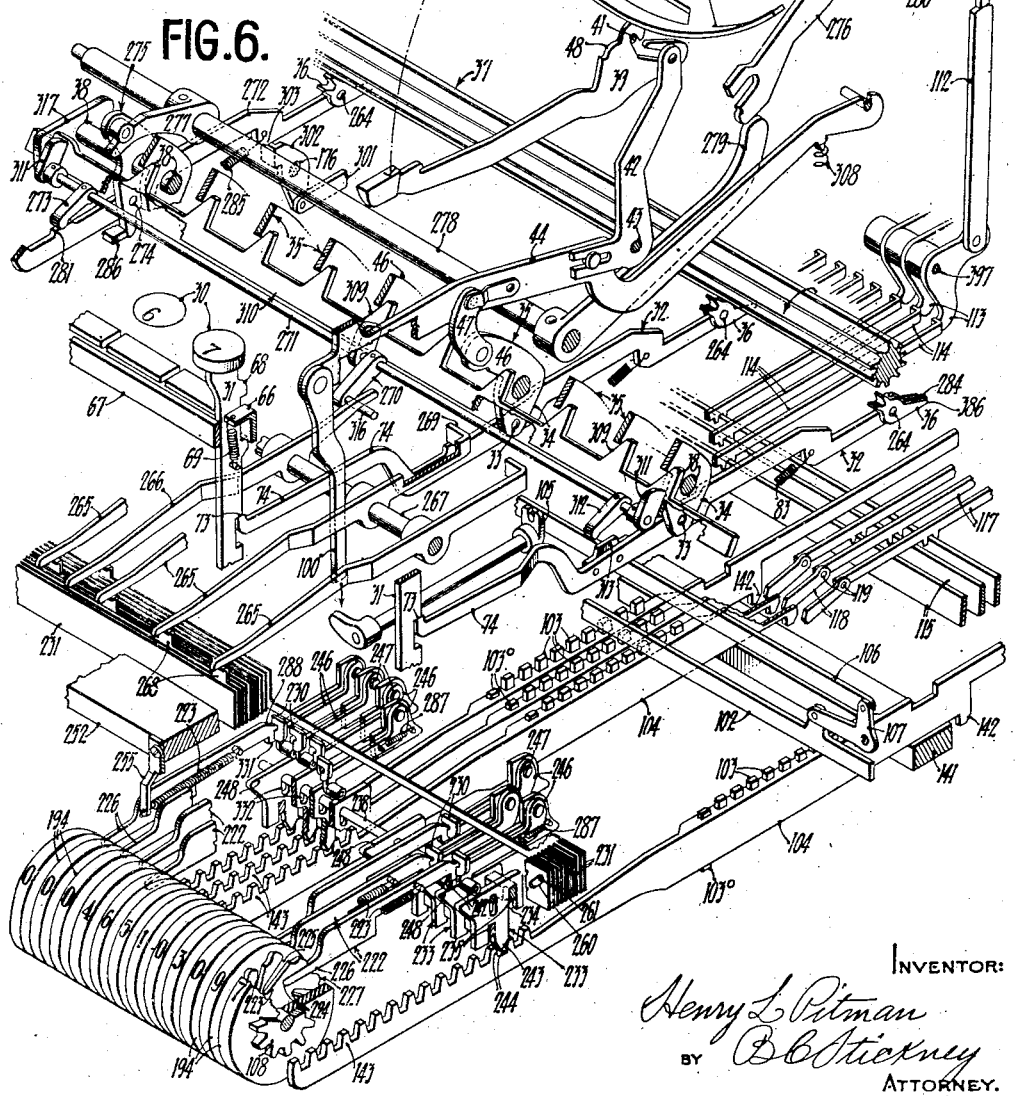
Figure 6 is a perspective of a register, the typing mechanism, and the total reading and type selecting mechanism.

Depression of a typewriter numeral-key 30, Figures 1, 2, and 6, surmounting a new key-stem 31, causes the latter to rotate a draw-link 32 about its pivotal connection 33 to depending arm 34 of a lever 35; and dog 36, pivoted to said draw-link, is thereby meshed with a toothed power driven shaft 37 which may be journaled in the typewriter frame and may be connected to a power drive, not shown, for continuous rotation. Said power shaft 37 thus pulls the draw-link 32 rearwardly to rock the lever 35, counter-clockwise of Figure 1, about a fulcrum-shaft 38, to swing a numeral type-bar 39, to print upon a work-sheet on platen 40. The type-bar 39 is swung about the usual arcuate fulcrum-rod 41 by the usual bell-crank 42, mounted on fulcrum-rod 43 and connected to a new operating lever 44 extending forwardly from the usual Underwood key-lever fulcrum-rod 45, said operating lever 44 being connected to upwardly extending arm 46 of the lever 35 by a link 47.

At the end of the printing stroke the draw-link 32 becomes disengaged from the power-shaft 37 to permit a recoil of the type-bar 39 from the platen and restoration of the type-action as will be further described hereinafter with reference to automatic total printing.

Near the end of the printing stroke heel 48 of the type-bar 39, Figures 1 and 6, engages the usual spring-returned universal bar 49 to actuate a dog-rocker 50 to engage a holding dog 51 with an escapement wheel 52 and withdraw a stepping dog 53 preparatory to a letter-feed step of platen carriage 54 at recoil of the type-bar. Said escapement wheel 52 has the usual connection, rack 55 and pinion 56, to said carriage 54 which is urged leftward by the usual spring motor 57 and runs along upon front and rear rails 58, 59.

There is one of the described numeral type-actions, including draw-link 32 and new key-stem 31, for each of the ten digits, from 0 to 9, see Figure 2. The new operating levers 44 are guided by a comb 60 fastened to typewriter-frame 61 at 62 and presenting brackets 63 to which are attached by screws 64 and spacers 65 a slotted angle-bar 66 and retaining strip 67 which serve as upper guide-means for the new key-stems 31. Key-stem shoulders 68 abut the angle-bar 66 to limit the key strokes, and key-stem-restoring springs 69 are anchored to said angle-bar 66. Each key-stem is slotted at 70 for articulation with another slotted key-stem-guiding cross-bar 71 fastened at 72. A key-stem shoulder 73 engages draw-link-arm 74 extending forwardly from the draw-link pivot 33. The several draw links 32 are guided by a front comb 75 attached at 76 to cross-bar 77 fastened at 78. The draw-links 32 are further guided by a slotted angle-member 80 fastened at 81 and are normally kept, Figure 1, against leg 82 of said angle member by restoring springs 83 attached to an anchor member 84 fastened at 85.

Figure 17:
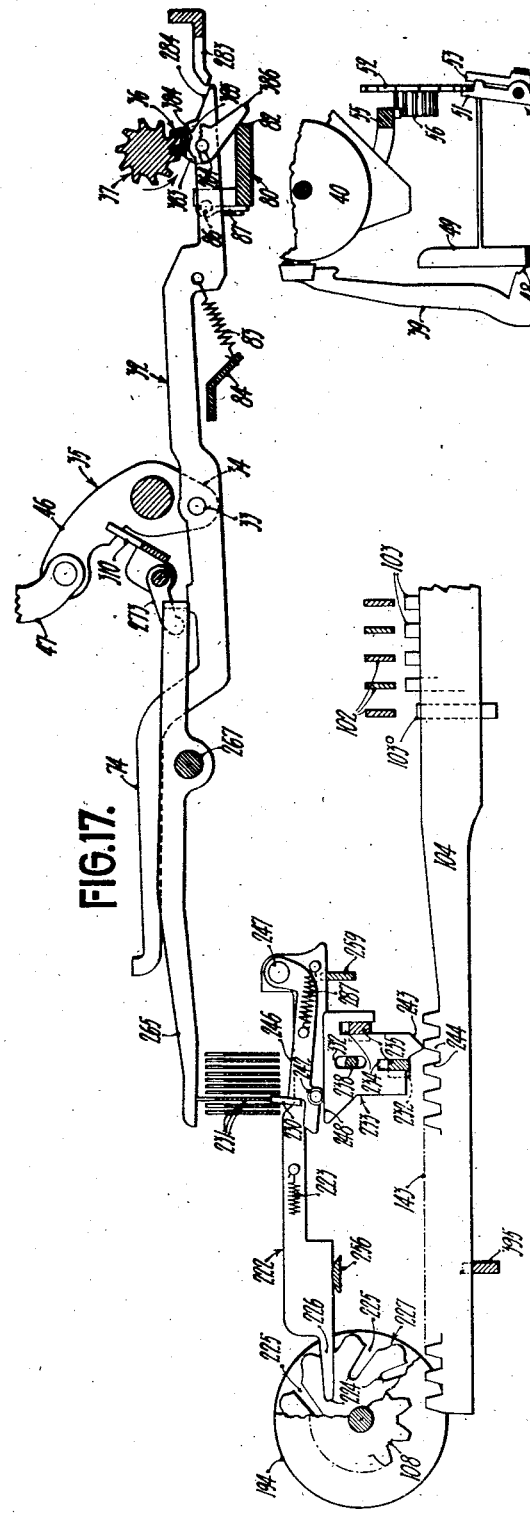
Figure 17 is a side view showing selection of a numeral-type action by the total-reading mechanism and the engagement of said type-action with the power-shaft.

A series of lock rods 86, Figures 2 and 17, is retained between said angle member 80 and a keeper-plate 87 and is confined endwise to permit entry of only one draw link 32 at a time therebetween to prevent simultaneous operation of more than one numeral key.

Dotted circles 89 in the last row of the typewriter keyboard represent a row of decimal-tabulating keys mounted upon key-levers 90 partly shown, Figure 2, in connection with decimal stop rods 91 for cents, hundreds and thousands. Said stop rods 91, retained in a housing 92, are selectively liftable to engage a column stop 93 on the carriage 54. A universal bar 95, Figures 1 and 13, is rockable in the housing 92, by the lifting of any stop rod 91, to release said carriage for an ensuing tabulating advance by raising the feed-rack 55 from the escapement pinion 56, said universal bar 95 having an arm 96 engaging the usual rack-raising lever 97.

At operation of any numeral-type-action a companion rod 100, depending from the type-action lever 44 into computing base B and guided by the slotted cross-bar 77, Figures 1, 2, 3 and 6, engages and rocks a digit shaft 101 to depress a digit cross-bar 102 for setting the proper one of a series of digit pins 103 provided on each one of a sufficient number of register-bars or computing wheel-drivers 104. Each digit rock-shaft 101 is connected to its pin-setting bar 102 by the usual means including rock-shaft arm 105, endwise movable upper link 106, and end bell-cranks 107, Figure 6. The several pin-setting linkages each including the elements 101, 102, 105, 106, 107 are part of a known assemblage mounted in the computing base B, and a restoring spring, not shown, acts to restore each linkage upon retraction of the pendent rod 100 at restoration of the numeral type-action following printing.

Figure 3:
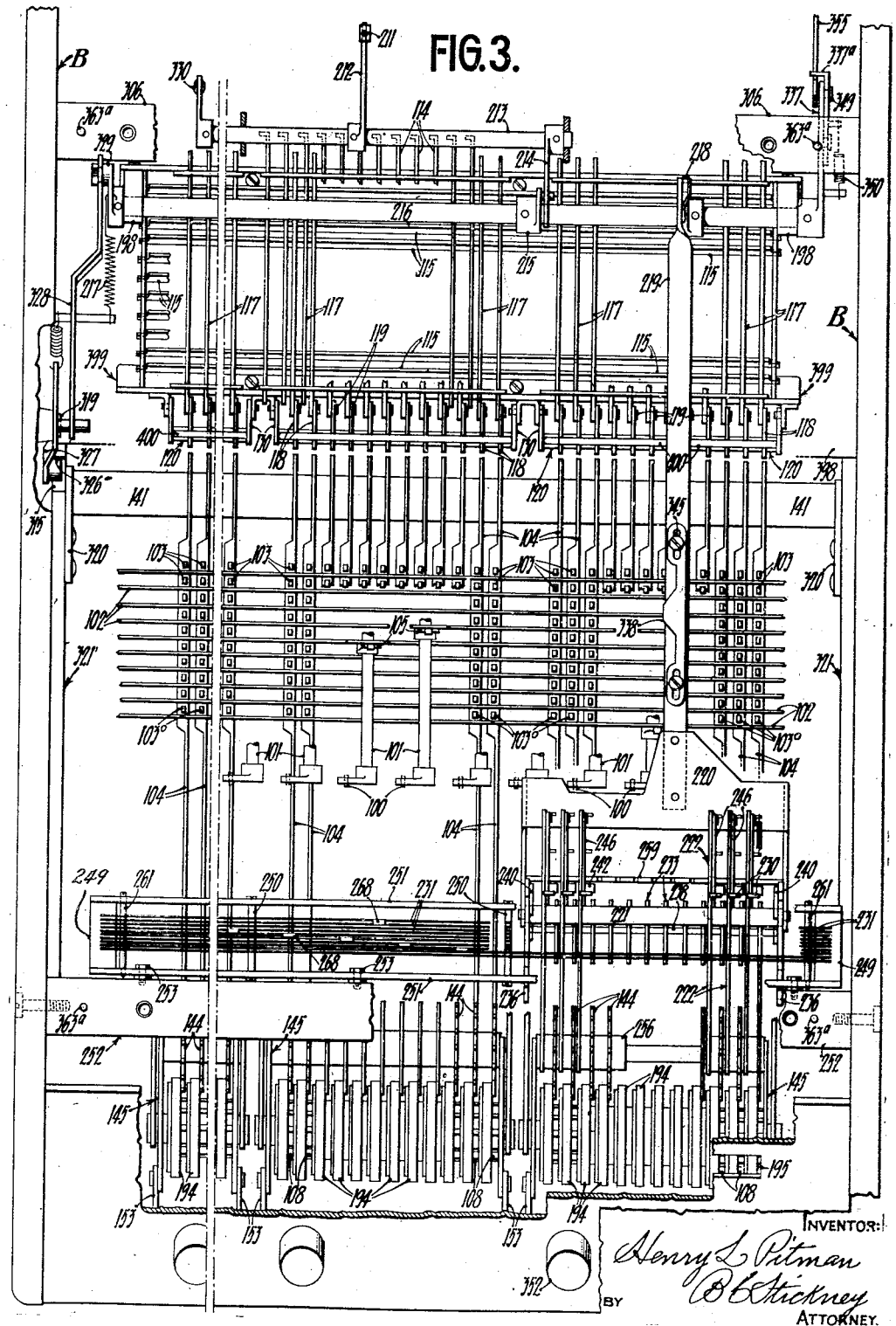
Figure 3 is a plan of the computing base and represents a plurality of registers, indexing means therefor, and the total reading and type-key-selecting mechanism.

The computing base B is represented, Figure 3, as having three registers or sets of computing pinions 108 and three sets of register-bars 104, the pin-setting bars 102 being, as usual, common to all the register-bars.

Pin-setting or indexing is under control of the typewriter carriage 54, for selecting the set or sets of register-bars to be indexed and for indexing the register-bars denominationally. The mechanism therefor may be substantially as shown in my co-pending application filed April 12, 1932, Serial No. 604,691 and, briefly described, is as follows.

A universal set of denominational jacks 110, Figures 1, 2, 6 and 12, traversable by a denomination-selecting tappet 111 on the typewriter carriage 54, is operatively connected by rods 112 and bell-cranks 113 to a master set of denominational racks 114, Figures 1, 3 and 6, meshing with a bed of distributive denominational cross-blades 115 seated in fulcrum notches 116, in the computing base for rocking individually about their lower edges through endwise movement of the master racks 114. For each set of register-bars 104 there is a set of register-bar control-racks 117, each of the latter meshing with the cross blade 115 of corresponding denomination. The control racks 117 for the middle set of register bars 104 are interspaced, Figure 3, with the set of master racks 114. Each control rack 117 has a coupler 118, and each set of couplers is individually swingable as a unit, about pivotal connections 119 of the couplers 118 to said racks 117, to bring the latter into or out of operative relation with the corresponding set of register-bars 104.

Figure 18:
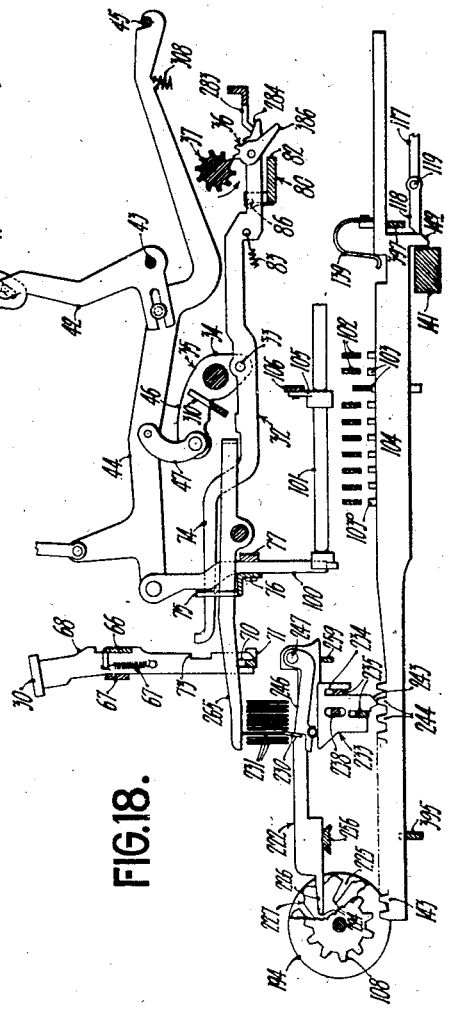
Figure 18 is similar to Figure 17 and shows the numeral type-action operated by the power-shaft.

The forward ends of the couplers 118 are normally depressed, Figure 1, and each set of couplers is liftable into the operative position, seen in Figure 18, by an individual bail 120 under control of the carriage. For each of the three sets of register-bars 104 there is a cam-plate 122, Figures 1, 2, 10 and 12, traversable by a register-selecting tappet 123 on the carriage, said cam-plate 122 being mounted in a housing 124 for edgewise depression which is translated into lift of the corresponding set of couplers 118 by means of a train including slide 125 retained in said housing, and a companion push rod 126, Figures 1 and 10, connected to a bell-crank 127 from which extends a push rod 129 to an arm 130 of the coupler-lifting bail 120. The intermediate slides 125 stand crosswise of the cam-plates 122 and are properly allotted to the latter by means of tabs 131. A restoring spring 132 restores said train to the normal Figure 1 position determined by stopping the bail arm as at 133, Figure 1.

It will be understood that the connections of the master racks 114 and register-control racks 117 to the cross-blades 115 of the denominational trains are arranged to transpose the order of said control-racks 117 relative to said master racks 114.

A tappet-block or unit 135, Figures 1, 10, 12 and 13, is located for a computing zone by means of a rack 136 on the carriage 54 and includes the zone tabulating stop 93, the denomination-selecting tappet 111 and one or more of the register-selecting tappets 123. A guide-rail 137 steadies the tappet-block 135 as the latter traverses and actuates the denomination jacks 110 and register-selecting cam-plates 122. Said cam-plates are substantially co-extensive with the computing zone in order to maintain the selected couplers 118 in operative position throughout the traverse of said zone by the carriage.

The indexing operation may be summarized briefly now as follows: Upon entry of the carriage into a computing zone one or more register-selecting cam-plates 122 will be depressed, thereby causing the corresponding set or sets of couplers 118 to connect the corresponding set or sets of register-bars 104 to the universal set of denomination jacks 110 through the master racks 114, the distributive cross-blades 115 and the register-bar control-racks 117. The denomination-selecting tappet 111 is thereby enabled, at whichever denomination the carriage reaches at said entry, to slightly advance the register-bar of corresponding denomination in each selected set to position its digit-pins 103 under the pin-setting bars 102. The printing stroke of any numeral type-action will thus set the appropriate digit-pin 103 in the thus advanced register-bar 104 of each selected set.

At the beginning of the return stroke of the numeral type-action the carriage will step, by means of the carriage-feed mechanism, to the next denomination, thereby releasing the depressed jack 110 and consequently allowing the indexed register bar or bars to become restored to the Figure 1 position by the usual spring device 139. In turn, at said next denomination, a register bar or bars of corresponding denomination will be slightly advanced for indexing by operation of any numeral type-action; and, similarly, by further operation of the numeral type-actions the indexing proceeds to the last denomination.

Following the indexing operation the usual reciprocatory general operator cross-bar 141, Figures 1, 3 and 6, is cycled to engage, in its advance-stroke, the set pins 103 of the indexed register bars 104 and advance the latter the indexed extents, for rotating the computing pinions 108 which, as will later on be explained, will be connected to the register bars for rotation. Said general operator 141 at its return stroke engages shoulders 142 of the operated register bars to restore the latter to the Figure 1 position. The springs 139 act in the usual manner to restore the register-bars beyond the general operator return stroke to provide for the aforesaid slight advance of the register-bars for indexing.

Computing-pinion-driving racks 143 on the register-bars are permanently in mesh with idlers 144, the computing pinions 108 standing normally disengaged, Figure 1, from both said racks and idlers. A frame 145, Figures 1 and 22, mounting each set of computing pinions 108, is shiftable to mesh the latter either with the set of racks 143 for additive rotation or with the set of idlers 144 for reverse subtractive rotation. A frame-shifting rock-shaft 146 is connected by arm 147 and a cam-following link 148 to a cam-shaft 149, connected by known means (not shown) to the cycling mechanism, so as to make a single complete revolution at each general operator cycle. Said cam-shaft 149 is timed to rock said shaft 146 clockwise of Figure 1, for bringing the computing pinions into mesh, with either the racks 143 or idlers 144, before the general operator advances the register-bars, and to rock said shaft 146 oppositely for unmeshing the computing pinions just before said general operator returns the register-bars.

Working connections between said pinion-shifting rock-shaft 146 and each one of the computing pinion frames 145 and controlling means for said connections may be for the purpose of the invention substantially as shown in my copending application No. 611,838, filed May 17, 1932, and, briefly described, are as follows.

A yoke 151, Figures 1 and 22, for subtraction connection, is loosely mounted on the rock-shaft 146 for independent rotation of the latter and has at each end an arm 152 connected by link 153 to a side of the computing-pinion frame 145. Another arm 154, for addition connection, is also loose on said rock-shaft 146 and has a slot 155 engaging a cross-rod 156 at the front of said computing-pinion frame 145. Slots 157, in the sides of the computing wheel frame, are fitted to an axle 158 by collars 159, said axle also mounting the idlers 144. A coupler 160 having end ears 161 fitting the pinion-shifting rock shaft 146 is splined to the latter for turning therewith and for movement therealong from a normal neutral position to adding or subtracting position. In the adding position of said coupler 160 (see the left-hand register, Figure 22) a tongue 162 of the latter registers with the adding arm 154 while another tongue 163 is opposite a clearance notch 164 of the subtraction yoke 151 and is thus disconnected from the latter. In the subtraction position of said coupler 160 (see the right-hand register, Figure 22) the adding tongue 162 is withdrawn from the adding arm 154 and the tongue 163, moved from the clearance notch 164, is ready to actuate the subtraction yoke 151. At the neutral coupler-position between the adding and subtraction positions, both tongues 162, 163 are clear, respectively, of the adding arm 154 and subtraction yoke 151.

A state-controller 166, Figure 22, has a cam-slot 167, co-acting with a cam-following slide 168 articulated to said coupler 160 at 169, for shifting said coupler 160 from neutral to an adding or subtracting position. Said state-controller is normally held in neutral position by a latch 170 connected to the register-selecting coupler-bail 120 at 171, Figure 13, so that, by the register-selecting operation of said bail 120 at entry of the carriage into a computing zone, said latch 170 is withdrawn, whereupon said state-controller 166, urged by spring 172, shifts to an active position against a secondary latch 173 which is withdrawable for a further shift of said state-controller 166 to another active position, one of said active positions determining addition, and the other active position determining subtraction. For their automatic withdrawal, by entry of the carriage into a computing zone, the several secondary latches 173 are each connected, to an arm 175 of a common latch-retracting rock-shaft 176, Figures 1 and 13. The tappet-block 135 on the carriage 54 may include a subtraction-tappet 177, Figure 10, to depress a subtraction-cam plate 178 which thereby, through a slide 179, Figure 13, a push-rod 180 and a usual rock-shaft 181, withdraws a latch-bar 182 from a spring-pressed lever 183, and thereby causes the latter to coact with a cam-arm 184 of said latch-retracting rock-shaft 176 to rock the latter to withdraw the secondary latches 173, and thereby cause each state-controller 166, whose primary latch 170 is withdrawn for selecting the corresponding register, to assume its farthest forward position for determining subtraction, the state-controller position, effected by withdrawing only the primary latch 170, being determinative of addition. For a purpose and in a manner hereinafter explained, the first active position of the state-controller 166 for one of the registers will determine subtraction, instead of addition, the additive state being determined by withdrawing both latches 170, 173 for that state-controller. The slide 179 of the secondary or subtraction-state-controlling train may be similar to the slide 125 of the hereinbefore-described register-selecting train, and may be retained with the secondary or subtraction-cam plate 178 in the housing 124, said cam-plate 178 being similar to the register-selecting cam-plates 122.

It will be understood now, with reference to any set of computing pinions 108, that at entry of the typewriter-carriage into a computing zone, either the primary latch 170 alone or both said primary latch 170 and the companion secondary latch 173 may be withdrawn, thereby causing the state-controller 166 to differentially advance from its neutral position and shift the state-controlling coupler 160 from neutral position to its adding or subtracting position. The secondary latch-controlling rock-shaft 176 may be rocked, to withdraw the secondary latches 173, by pressing the usual subtraction-key 185, Figure 1, the latter having connections (not shown) for controlling said rock-shaft 176, a suitable form of said connections being shown in my aforesaid application No. 611,838.

As the typewriter carriage 54 letter-feeds upon typing and indexing the last digit of an amount in a computing zone the register-selecting tappets 123 and the subtraction tappet 177 in the tappet block for said zone pass from and thereby release the cam-plates 122, 178 and associated latch trains including the latches 170, 173 preparatory to return of said latches into state-controller-holding place.

The general-operator cross-bar 141 may now be cycled, and during the cycle each selected set of computing pinions 108 meshes either with the racks 143 for addition, or with the idlers 144 for subtraction, depending on the extent of release of the corresponding state-controller 166 by means of the latches 170, 173. Near the end of the return stroke of the general-operator cross-bar 141 the latter engages and drives a hook-link 187 connected, see Figure 1, to a rock-shaft 188 connected by rods 190 to a cross-bar 191 which is thus driven, rightward of Figure 1, to engage and restore the released state-controllers 166 for reengagement with the now free latches 170, 173 which are urged downwardly into normal place by springs, not shown. Following return of the state-controllers 166, the hook-link 187 is caused to be disconnected from the general-operator cross-bar 141 before the end of the cycle, and said cross-bar 191 is thereby caused to be returned, by spring 193, to the Figure 1 normal position to leave the state-controllers 166 free for subsequent advance.

The digit-pins 103 on each registering bar 104 are interconnected, as shown in my aforesaid Patent 1,927,951, for example so that the setting of any digit-pin higher than "0" restores the "0" digit-pin 103°, the latter being normally set as in Figure 1.

A carry-over train, not shown herein but described in my aforesaid patent, may extend from each computing wheel 108, except the highest, and may advance the register-bar 104 of next higher denomination an extra or carrying step by co-operating with the set digit-pin of said next register-bar during the general-operator cycle. During the general-operator return stroke, a pin-restoring bail 196, one for each register, pivoted at 192 in the register-flanking side plates 258 on the machine-framework, is raised by the rock-shaft 188 to engage and rock levers 197, pivoted to the register-bars 104 and connected to the "0" digit-pins 103°, said rock-shaft 188 having an arm 188ᵃ for engaging a cross-rod 196ᵃ of each bail 196. Said digit-pins 103° are thus depressed to the Figure 1 position by means of said bail 196, to cause restoration of all the higher value digit-pins 103 that were set for indexing.

Each computing pinion 108 has the usual digit-dial 194 visible at a sight-opening 195 in the computing base B.

The novel automatic-total-printing mechanism, usable, in lieu of visually reading the dials 194 at the sight-opening of a given register and manually operating the corresponding numeral type-keys 30, for transcribing the total to a work sheet, will now be described.

With the typewriter carriage 54 positioned for advancing leftward into a total printing zone, a total key 200, Figures 1, 2, 10 and 13, is depressed with its key-lever 201, similar to the tabulating-key-lever 90 and mounted with the latter on a common fulcrum rod 202 in the typewriter. A stop rod 203, similar to the tabulating stop-rods 91 and mounted in the housing 92 is raised by said total key-lever 201 and at the initial part of its rise a pin 204 of said stop-rod 203 cams a thrust-link 205 rearwardly. Thus said thrust link 205, articulated to a cam-plate 206, as at 205ᵃ, Figures 1 and 12, turns said cam-plate 206 about a lower cam-plate guide-means 207 of said housing 92 to bring the upper edge of said cam-plate rearwardly from the normal Figure 1 position into line, Figure 13, with a total-printing-control tappet 208 provided on the tappet-block or unit 135 for the zone in which the total is to be printed. Further rise of said stop-rod 203 by completing depression of the total-key 200 causes the carriage to be released in sequence to bringing said cam plate 206 in line with said tappet 208, said stop rod 203 releasing the carriage by means of the universal bar 95, the arm 96 and feed-rack raising lever 97. With the total-key 200 held down the released carriage, driven by its spring 57, advances until the column stop 93 of said tappet-block 135, for the total printing zone, is intercepted by upper end 209 of said fully raised stop-rod 203, the carriage being thus arrested, see Figure 6, at a point about one step before the highest denomination of the total printing zone and at which point the totalling-control tappet 208 will have depressed the cam plate 206 as shown in Figure 13.

The depression of said cam-plate 206 acts, through a slide 210, similar to the register selecting and subtraction slides 125, 179, a push-rod 211, arm 212 and a rock-shaft 213 to withdraw a latching arm 214 of said rock-shaft 213 from an arm 215 of a rock-shaft 216 journaled in lugs 198 of the computing base framework. Said rock-shaft 216, thus released, is rocked by spring 217 counterclockwise, from the Figure 1 position to the Figure 13 position, and thereby, through a rock-shaft arm 218, and a connecting rod 219 connecting said arm 218 to a frame 220 having a cross-bar 221, causes said cross-bar 221 to recede forwardly from a set of total reading feelers 222 which, each urged by a spring 223, thus assume total reading position with reference to one of the sets of computing pinions 108. The total printing mechanism, including said feelers 222, is herein shown in association with the right-hand or number 3 register.

For reading the digit-positions of the computing wheels at total-taking, each total-reading feeler 222 is stopped by a digit-evaluating spiral, Figures 1, 6 and 14, formed by slots 225 ending at digit-evaluating points 224 on the line of approach of a spiral-engaging finger 226 of said feeler. Said slots 225 are shown formed in a disk 227 co-operating with the usual spring-pressed computing-wheel-detent 228, Figure 14, and fastened to the companion computing-pinion dial 194 as at 229.

Each total-reading feeler 222 includes a numeral-type selector 230, which, according to the digit-reading feeler-position, becomes positioned under the corresponding one of a set of digit-blades 231, each of which extends crosswise of the computing base for co-operation with the feeler 222 of any denomination and for co-operation, as will be described later on, with the numeral-type-actions. The fingers 226 of the total readers or feelers 222 are shown tapered to bear against the similarly tapered sides of said slots 225 for stabilizing the computing wheels at engagement of the latter by said feelers 222. The stroke of the feeler 222 is least for engagement with the highest point of the digit evaluating disk 227, and therefore at said highest point, herein corresponding to "0", a slot such as 225 may be omitted as shown at 245, Figure 14.

Recession of the feeler-controlling cross-bar 221 for total-reading may be utilized for causing the type-selectors 230 to become operatively connected to the register-bars 104 for denominational control of said type-selectors and for such connection there is a group of interponent-plates 233, Figures 1, 3, 6, 8 and 14, one for each denomination. Each interponent plate 233 has slots 234 engaging guide-bars 235 fixed between two supporting plates 236 having horizontal guide-slots 237 for the feeler-controlling cross-bar 221 of the frame 220, the latter being guided also by the rock-shaft arm 218, to which is pivoted the connecting rod 219 fixed to said frame 220. Said guide bars 235 have slots 232 spacing said interponent-plates 233 and the latter are collectively controlled by a cross-rod 238 seated in notches 239, Figure 15, of two side plates 240 guided by said guide-bars 235 for vertical movements. Each side-plate 240 has a cam-edge 241 normally engaged by the feeler-controlling cross-bar 221, Figure 16, to uphold said side plates 240 and cross-rod 238.

As the cross-bar 221 recedes from the feelers 222, it also recedes from said cam-edges 241 of the side plates 240, and causes the latter to drop by gravity, together with the interponent-plate-upholding cross-rod 238 and the interponent-plates 233, and a cam-edged tongue 243, on each interponent-plate, normally clear of the register-bars 104, as in Figure 16, is dropped between two adjoining teeth 244 of the companion register-bar rack 143, and the latter is thereby operatively connected to the companion type-selector 230, Figure 14. Normally the register-bars 104 are clear of the interponent-plates 233 and therefore are not impeded by the type-selecting trains during item-indexing and accumulating operations.

Each type-selector 230 is bent transversely from an arm 246, pivoted to the companion feeler 222 at 247, and has a roller 242, which normally, when the feelers 222 are retracted, stands to the rear of the interponent-plate 233, Figure 16. As the interponent-plates 233 drop and the feelers 222 move to digit-reading positions, each type-selector roller 242 becomes positioned over a top edge 248 of its interponent-plate 233, Figure 14, said top edge being long enough to engage said roller 242 at any digit-reading feeler position.

The cross-blades 231 are spaced according to the digit-reading steps of the feelers 222 by slotted end and intermediate guides 249, 250, forming with cross-members 251 a frame attached at 253 to a cross-bar 252 of the machine-framework. By having the line of feeler-entrance into the digit-evaluating slot 225 of the computing wheels offset from the computing-wheel center, instead of radial, there is gained an increase in the difference between the feeler-advances to "0" and "9" positions, and the difference in feeler-positions for any two successive digits is correspondingly increased for more certain selection of the proper cross-blades 231, inasmuch as the latter, correspondingly, may be spaced more from one another.

The two supporting plates 236 may be articulated to said cross-members 251 as at 254, Figure 16, to depend from the latter, and the cross-bar 252 supports anchor-comb 255 for the feeler-springs 223. The several feelers 222 are guided and spaced laterally by grooved collars 256, between the idlers 144, grooved rod 257 mounted between side plates 258, seen at Figure 22, supporting the computing-pinion frame 145, and a slotted bar 259 supported by the plates 236. Each cross-blade 231 has diagonal slots 260 co-operating with blade-supporting rods 261, retained between the cross-members 251, to guide said blade for up-and-down movement while maintaining the blade horizontal during said movement.

Having depressed the total-key 200 and held it down until the released typewriter-carriage 54, at its arrest by the stop-rod 203, has depressed the cam-plate 206 to release the feelers 222 and drop the interponent-plates 233, depression of said cam-plate 206 also depressing slide 179 of the subtraction-setting train to withdraw the subtraction-latches 173 from the state-controllers 166, said total-key is released, and thereby the carriage arresting stop-rod 203 is returned by its spring 262, and the carriage-rack 55 is restored to the escapement-pinion 56, whereupon said carriage 54 takes the usual step, bringing it to the highest denomination of the total-printing zone. At such release of the total key 200, the cam-plate 206, having done its work, may be swung forwardly again by its spring 263 and be raised to its normal position by its train which includes the rock-shaft 213, the latter having a restoring spring 330, and its arm 212 abutting a bar 306 of the machine framework as at 291 to gage the normal position of said cam-plate 206 and train.

At the highest denomination of the total-printing zone, the denomination-selecting tappet 111 of the tappet-block 135 presses the highest denomination-jack 110, while the tappet 123 provided in said block for selecting the No. 3 register, from which the total is to be taken, depresses the cam-plate 122 to raise the couplers 118 into operative connection with the set of register-bars 104 for said No. 3 register, thereby causing the register-bars of highest denomination to be slightly advanced. The bail 120, raising the couplers 118 into effective position, also withdraws the addition latch 170, and, the subtraction-latch 173, having been withdrawn through depression of the cam-plate 206, the state-controller 166 shifts, to its extreme forward position, to cause the subtraction-yoke 151 for said No. 3 register, on the computing-pinion-shifting rock-shaft 146 to become coupled to the latter.

It results from said slight advance of the highest denomination register-bar 104 that the register-bar rack-tooth 244 cams the dropped interponent-plate 233 of highest denomination upwardly, thereby raising the type-selector 230 to raise the digit-blade 231, under which said type-selector 230 is positioned according to the feeler-reading. The raising of the digit-blade 231 rocks the proper one of a set of levers 265, one for each of the digits from "1" to "9," or another lever 266 related to the digit "0." The several levers 265, 266, Figures 3, 6, 8, turn about fulcrum-rod 267 mounted in the typewriter, and register with their respective digit-blades 231 by means of digit-blade lugs 268. The levers 265, for "1" to "9," have lateral turns 269 for engaging the draw-link arms 74 of the corresponding numeral-type actions.

The "0" lever 266 may operate the "0" type action; or it may operate the carriage-escapement, without printing, for each "0" ahead of the first significant figure of the registered total.

With the computing pinion 108 of highest denomination registering a non-significant "0", the slight advance of the corresponding register-bar 104 acts through the type-selector 230 and the "0" digit-blade 231 to rock the "0" lever 266, whereby the latter, engaging an arm 270, Figure 7, of a rock-shaft 271, rocks the latter to rock a draw-link 272 by an arm 273. Said draw-link 272 is pivoted at 274 to a lever 275 mounted, with the similar numeral-type-action levers 35, on the fulcrum-shaft 38. Rocking of said draw-link 272 meshes its dog 36, pivoted at 264, with the rotating power-shaft 37, causing the latter to first rotate said dog into a stop-position like that seen in Figure 17, representing a numeral-type action, and then to pull said draw-link 272 rearwardly to rock the lever 275 counterclockwise, Figure 7. Said lever 275, when thus rocked, cooperating with an arm 277 of a rock-shaft 278 to rock the latter, which, through an arm 279, rocks a frame 280 pivoted in the typewriter and having an arm 276 engaged by said arm 279, and side arms 282 connected to the escapement universal bar 49, which is thus drawn rearwardly to rock the escapement-dog-rocker 50 clockwise of Figure 7. Having thus actuated said dog-rocker, by means of the draw-link 272, the latter becomes disengaged from the power-shaft 37 by a cam-edge 284 of said draw-link 272 coacting with an abutment bar 283, mounted in the typewriter, as depicted for the numeral-type-action of Figure 18, and a spring 285, Figure 6, then acts to move said draw-link 272 and the lever 275 back toward normal position determined by a stop 286 on the typewriter. The draw-link-rocking arm 273 remains depressed while the draw-link 272, by coaction with the abutment bar 283, is being disengaged from the power-shaft 37, and, in order that said depressed arm 273 may not obstruct such disengagement of the draw-link 272, a draw-link-land 281, initially engaged by said arm 273, will have moved rearwardly and clear of said arm 273. At return of the draw-link 272 and the lever 275, the arm 277 and the escapement-dog-rocker 50 connected thereto also return toward their normal positions, thereby causing the typewriter-carriage 54 to advance to the next denomination, and causing the highest denomination register-bar 104 to be restored by its spring-device 139, with consequent restoration of the companion interponent-plate 233, type-selector 230 and "0" digit-blade 231. Each type-selector 230 may have a restoring spring 287 and may normally stop against the feeler 222, as at 288, Figure 14.

By the advance of the carriage 54 to said next denomination, the corresponding register-bar 104 is slightly advanced, and it results, if the computing wheel 108 at that denomination also stands at "0", that the described automatic carriage-spacing operation, without printing, is repeated. Such automatic spacing of the carriage thus occurs for each non-significant "0".

The printed total may be punctuated by spaces which the carriage traverses by operation of the escapement without printing.

Should the carriage reach a punctuation space by a step of the carriage from a non-significant "0" denomination, the denomination-selecting tappet 111 will, at said space, depress a punctuation jack 289, Figures 19, 20, 21, for connecting the carriage-spacing draw-link 272 to the power-shaft 37 for causing the carriage to traverse said punctuation space. Depression of any one of the four punctuation jacks 289, herein shown interspersed with the denomination jacks 110, will depress a secondary jack 290 through cross-bail 292 pivoted to the jack-housing 124 at 293 and connecting the several punctuation jacks 289 to the secondary jack 290 by pin-and-slot connections 294. The secondary jack 290 does not extend into the path of the denomination-selecting tappet 111, and it is connected by link 295 to a bell-crank 296, mounted with the bell-cranks 113 of the denomination-selecting trains on a fulcrum rod 297 provided in the computing base.

The bell-crank 296 when rocked by depression of any punctuation jack 289, Figure 19, coacts with an arm 298 to rock a shaft 299, which, through another arm 300 and a link 301 connected to a lever 302, rocks the latter to rock the carriage-spacing draw-link 272 into engagement with the power-shaft 37, which is thus caused to step the carriage, as above described, for the punctuation space. The shaft 176 controling the subtraction latches 173 is used as a fulcrum for said lever 302, the latter being loose on said shaft 176.

At the power-driven rearward movement, at punctuation spacing, of said draw-link 272 a land 303 thereof initially engaged by the punctuation-train lever 302 passes from the latter in order that said draw-link 272 may become disengaged from the power-shaft 37, it being understood that said lever 302 remains rocked, Figure 19, until the carriage passes from the punctuation denomination and releases the punctuation-jack-train which thereupon becomes restored, by a spring 304, to normal position gaged by a stop-arm 305, on the rock-shaft 299, abutting the cross-bar 306 having brackets 307 for said rock-shaft 299 and the feeler latching rock shaft 213.

By its automatic traverse of the non-significant "0" and punctuating denominations, the carriage 54 arrives at the denomination of the computing wheel 108, registering the first significant digit, for example "4", registered by the fourth computing wheel 108 from the left, Figures 6, 7 and 8. At said first significant-figure denomination, the type-selector 230 at that denomination being under the "4" digit-blade 231, the slight advance of the register bar 104 will raise said type-selector 230, and the "4" digit-blade 231, and thereby rock the draw-like 32 of the "4" numeral-type action into mesh with the power-shaft 37, which is thereby caused to actuate said type-action to print "4" upon the work-sheet, and step the carriage to the next denomination.

Similar action would take place for any other first significant figure, "7", for example, as represented in Figures 13, 17 and 18. Figure 17 represents the slight advance of the register-bar 104 as having raised the companion interponent plate 233, the companion type-selector 230, and the "7" digit-blade 231, and thereby rocked the lever 265 and the draw-link 32 of the "7" type-action into mesh with the power-shaft 37. Figure 18 represents the "7" type-action as having been operated in its printing stroke by said power-shaft 37 as a result of the Figure 17 condition. Figure 18 also shows how said draw-link 32, by coaction with the abutment bar 283 has become disengaged from the power-shaft 37 at the end of said printing stroke, it being understood that said printing stroke is followed by type action restoration aided by the usual type-action spring 308, Figure 1, and the draw-link spring 83.

In order that any computing wheel, registering "0" after the first significant figure, may cause actuation of the "0" type-action, operation of any digit-type-action for a first significant figure results in shifting the connection of the "0" digit-blade 231 from the carriage-spacing draw-link 272 to the draw-link 32 for the "0" type-action. To this end, the printing stroke of the type-action, called into use for the first significant figure, causes the lever 35 of said type-action to engage a companion one of a series of cam-edges 309 of a cross-slide 310 to displace the latter rightward from the Figure 7 to the Figure 8 position. The rock-shaft 271, journaled in lugs 311 of said cross-slide 310, is thereby shifted rightward to move its arm 273 away from the carriage-spacing draw-link 272 and to move another arm 312 of said rock-shaft 271 over a land 313 of the "0" type-action draw-link 32, the latter thus becoming operatively connected to the "0" lever 266 which remains in connection with a pin 316 of the arm 270 of said rock-shaft 271. The cross-slide 310 is slidably supported by brackets 317, Figure 2, attached to the typewriter.

Figure 4:
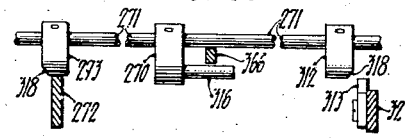
Figure 4 is a diagram of parts employed to render either the carriage-spacing mechanism alone or the zero-type effective.
Figure 5:
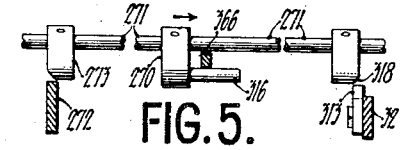
Figure 5 is a diagram showing how derangement of the parts of Figure 4 is prevented during a shift.

Before the arm 273 fully leaves the draw-link 272 at the rightward shift of the rock-shaft 271, the arm 312 will be partly over the draw-link 32 for the "0" type-section, and thereby a fall of said arms 273, 312 between said draw-links 272, 32, during such shift, is avoided, see Figures 4 and 5. Each arm 273, 312 may have a bevel 318 to facilitate its passage to the corresponding draw-link 272 or 32.

The printing stroke of the type-action for the first significant figure will set a corresponding digit-pin 103, by means of the rod 100, in the register-bar 104 for the first significant figure denomination, since the slight advance of said register-bar, utilized to bring the type-action into play, also positions the pins 103 of said register-bar under the pin-setting bars 102.

At recoil of the type-action which printed the first significant figure, the carriage steps to the next denomination which may be either for a punctuation space or for the next digit to be printed. In the latter case the register-bar 104 of said next denomination will be slightly advanced and thereby cause the digit-blade 231, corresponding to the digit read by the companion feeler 222 and type-selector 230, to be raised thereby causing actuation, in the manner described, of the type-action for printing said next digit.

Should said next denomination, or any other denomination after the first significant figure, be for a punctuation space the corresponding punctuation jack 289 will be depressed to cause the carriage-spacing draw-link 272 to be meshed with the power-shaft 37, whereupon the carriage will be spaced, without printing as above described. The train from the punctuation jacks 289 to the carriage-spacing draw-link 272 is unaffected by the described rightward shift of the cross-slide 310; and the latter remains in its rightwardly shifted position until the end of the total-printing, as will be further explained hereinafter. The printing, digit by digit, of the entire total, including any "0" after the first significant figure, proceeds for each digit as described, and results in setting corresponding digit-pins 103 in the set of register-bars 104 for the computing wheels associated with the feelers 222.

At the carriage-step which ensues upon printing the last digit, the denomination-selecting tappet 111, the total-control tappet 208 and the register-selecting tappet 123 pass, respectively, from the field of jacks 110, 289, the restored cam-plate 206 and the register-selecting cam-plate 122, and thereupon the machine may be cycled to advance and return the general-operator cross-bar 141. Said general-operator cross-bar 141 has end plates 320, Figures 1 and 3, connecting it to the usual side racks 321, connected to the usual cross-shaft 322 by side gearing (not shown) for reciprocating said cross-bar 141 parallelly.

For automatically initiating a cycle, an extension 93ᵃ of the column-stop 93 may pass, at said last carriage-step, over and rock the usual trip-lever 323 which may be mounted on a fulcrum-shaft 324, supported, by the housing 92, for endwise movement to bring said trip-lever 323 out of the path of said extension 93ᵃ for a purpose to be described later. Operation of said trip-lever by said extension 93ᵃ connects the general operator 141, 320—322 to a power-drive (not shown), for a cycle in which said general operator first advances and then returns, and in which cycle a shaft 325, Figure 1, connected to said general operator, also cycles. Said general operator may also be connected to said power drive by manually pressing the usual cycling key 314, Figure 1. Said general operator may also be cycled by manual operation of the usual handle (not shown) which may be attached to the cross-shaft 322.

Starting with the advance of the general operator, a side 326 of a notch 315 in one of the general-operator side racks 321, coacting with a spring-pressed lever 327 pivoted to the framework at 319, Figures 1 and 8, rotates said lever for retracting the total-reading feelers 222 from the computing wheels 108, and for raising the interponent-plates 233 from the register-bars 104, before the computing wheels 108 are shifted rearwardly into mesh with the idlers 144, it being remembered that operation of the total-key 200 and resulting release of the state controller 166 has caused the subtraction-yoke 151 to become connected to the pinion-shifting rock-shaft 146 through the coupler 160. Said lever 327 thus acts through a link 328 and an arm 329 of the feeler-controlling rock-shaft 216 to rock the latter clockwise from the Figure 13 position so that the rock-shaft arm 215 may become re-engaged with the latch-arm 214 as in Figure 8, said latch arm 214 having been restored by means of the spring 330 for the latch-arm rock-shaft 213. The link 328 has pin and slot connection 333 to the arm 329 of the rock-shaft 216, for independent feeler-releasing rotation of the latter. Said clockwise rotation of said feeler-controlling rock-shaft moves the feeler-controlling cross-bar 221 and its frame 220 to the rear of the Figure 13 positions to retract the feelers 222 by engaging shoulders 331 of the latter; and, as said cross-bar 221 nears the end of its return, it engages the cam-edges 241 of the plates 240 to restore the latter to the Figure 16 position, and thereby raise the cross-rod 238, and, with the latter, the dropped interponent-plates 233. Each interponent-plate 233 has a vertical slot 332, Figure 1, through which said cross-rod 238 is threaded, and which, when the latter is dropped, permits the interponent-plate to be raised individually by the slight advance of its register-bar 104.

Following restoration of the feelers 222 and interponent plates 233 in the cycle the computing-pinion-shifting cam-shaft 149 acts through the link 148 to rock the pinion-shifting rock-shaft 146 clockwise, Figure 22, thereby shifting the computing-pinion frame 145 rearwardly to mesh the computing pinions 108 with the idlers 144. Also following rocking of the feeler-controlling shaft 216 for restoration of the feelers 222, a cam 334, Figures 1 and 10, on the shaft 325, connected to the general operator, rocks a lever 335 to shift a latch-hook 336 thereon over an arm 337 of said feeler-controlling rock-shaft 216, to thereby lock the latter against feeler-releasing movement during the cycle. Following operation of the computing-pinion rock-shaft 146 to put the computing pinions 108 in train with the register-bars 104, the latter are advanced by the general-operator cross-bar 141 and thereby the computing pinions 108, connected to the idlers 144, will be rotated subtractively to subtract the printed total from the computing pinions 108 to clear the latter.

Movement of the feeler-controlling rock-shaft 216 is used for restoring the cross-slide 310 which was shifted rightward for bringing the "0" type-action into use after printing the first significant figure. The connecting rod 219 from said rock-shaft 216 to the feeler-controlling frame 220 has a cam-plate 338, Figures 3 and 8, to coact with a roll 399 on a cross-slide arm 340 which is slidably supported as at 341 by a plate 342 of the machine-framework. Said plate 342 also presents a detent 343 coacting with detent-notches 344 for detenting the cross-slide 310 in either one of its two positions.

At retraction of the feeler-controlling frame 220 by operation of said rock-shaft 216 by the lever 327 during the cycle, said cam-plate 338 acts to shift said cross-slide 310 leftwardly from the Figure 8 position to the Figure 7 position, thereby disconnecting the lever 266, controlled by the "0" digit-blade 231, from the "0" draw-link 32 and reconnecting it to the carriage-spacing draw-link 272. Should said cross-slide 310 with its rock-shaft 271 become shifted to the right again, after the cycle and before another operation of the total-key 200, such operation of the total-key would, through the resulting release of the rock-shaft 216 and forward movement of the connecting rod 219 and cam-plate 338, cause the cross-slide 310 to be shifted to the left before the total-printing initiated by said other operation of the total key proceeds. The cross-slide-resetting cam-plate 338 is shown adjustably mounted as at 345 upon said connecting rod 219.

The general-operator cross-bar 141, in its advance, engages arm 346, Figure 13, of the subtraction-latch-withdrawing lever 183 to rotate the latter into re-engagement with the control latch 182, whereby the subtraction-latches 173 are freed for interlocking with the state-controllers 166 upon restoration of the latter, it being noted that the primary latch 170 will also have been freed, for interlocking with the state-controller, by passage of the register-selecting tappet 123 from the register-selecting cam-plate 122. Before the return of the general operator picks up the advanced register-bars, the cam-shaft 149 acts through the pinion-shifting rock-shaft 146 to shift the No. 3 register computing-pinion frame 145 forwardly to disconnect the computing pinions from the idlers 144. Near the end of the return stroke of the general operator, the cross-bar 191 acts, as hereinbefore described, to return the state-controller 166, whereupon the latches 170, 173 drop back into locking position. Restoration of the state-controller acts through the state-controller cam-slot 167 to return the coupler 160 to neutral on the pinion-shifting rock-shaft 146 and thereby disconnect the latter from the computing-pinion-shifting-frame 145.

At the end of the general operator return stroke, the lever 327 drops again into the general-operator-rack notch 315, and thereby the feeler-controlling rock-shaft 216 again becomes subject to the control of the latch-arm 214, the latch hook 336 also being withdrawn from the lock-arm 337 of said rock-shaft by reason of the spring-pressed lever 335 dropping back, at the end of the cycle, into a notch 347, of a disk 348, Figure 10, forming the cam 334 of the cycling shaft 325. Said lock arm 337 of the rock-shaft 216 may be in two parts connected by a pin-and-slot joint 349 and a spring 350, so that the hook-engaging end 337ᵃ may yield to permit the hook 336 to swing, at the start of the cycle, to locking position before said end 337ᵃ has passed thereunder.

Following, in the cycle, the advance of the register-bars 104 for clearing the computing wheels 108 after automatic total-printing, the set digit-pins 103 will be restored by depressing their companions "0" digit pins 103° during the cycle as hereinbefore mentioned.

It will be seen now that the cycling of the general operator following total-printing has served, besides clearing the computing wheels 108, to restore the parts, released by the carriage, as a result of operating the total-key 200, to their normal conditions which obtained before the operation of said total-key; and that, after such cycle, therefore, a new total may be accumulated in the set of computing wheels 108 (the No. 3 register), associated with the automatic total-printing mechanism.

For automatic sub-total printing, without clearing the computing wheels, the state-controller 166 may be silenced, to prevent rotation of the computing wheels during the cycle following sub-total printing, either by returning said state-controller 166 to neutral position or by blocking its release from neutral position; it being understood that as a result of pressing the total-key 200 for a sub-total, the state-controller holding addition-latch 170 will be withdrawn incidentally to connecting the register-bars 104, by means of the couplers 118, to the denomination-selecting trains, to enable the latter to control the total-printing-controlling digit-blades 231, and that withdrawal of the subtraction-latch 173 also results from operation of said total-key 200 for a sub-total.

For silencing said state-controller 166, there may be provided a throw-off key-mechanism, such as shown in my aforesaid co-pending application 611,838, and herein used as a sub-total key mechanism. Said mechanism includes a key 352, Figures 1, 22 and 23, which, when depressed, rocks a bell-crank 353 about the rock-shaft 146 to draw forwardly a cam-slide 354 which, by engagement with a pin 358 of a lever 355, cams and turns the latter about its pivot 356 until a latching notch 357 of said cam-slide 354 is opposite said pin 358. Said lever 355, connected to the state-controller 166 at 360 and thus turned, moves said state-controller 166, if the latter has been advanced, rearwardly to neutral position and holds it there by reason of said pin 358 settling in the corner of said latching notch 357 through the influence of the state-controller spring 172 and letting go of said throw-off or sub-total key 352. Slight excess of restoring movement of the state-controller 166 by its restoring bar 191 during the general operator cycle causes the pin 358 to be withdrawn from the notch 357 of the cam-slide 354 whereupon the latter, urged by its spring 361, moves back to its normal position, Figure 22, together with the depressed total-key 352.

The sub-total key 352 may be pressed before pressing the total-key 200 for sub-totaling, in order to silence the state-controller 166 before the general operator cycle which automatically ensues by means of the trip-lever 323 upon printing the last sub-total digit. In such case the state-controller 166, without being first released, will nevertheless become interlocked with the cam-slide 354, by means of the lever 355 as said cam-slide 354 is moved forwardly by pressing the sub-total key 352. Figure 23 shows the state-controller latches 170, 173 still in normal place at the operation of the sub-total key 352 to block the state-controller 166, and as a result of said sub-total-key operation withdrawal of said latches 170, 173 through operation of said total-key 200 cannot establish advance of said state-controller 166 from its normal neutral position.

Pressing of the sub-total key 352 in connection with operation of the total-key 200 for a sub-total will result in the same operations of the machine as resulted, as hereinbefore described, from pressing the total-key 200 alone, with the exceptions that the operation of said sub-total key 352 prevents, by blocking the state-controller 166, rotation of the computing wheels during the cycle included in said operations, the indexed register-bars 104 being idly reciprocated and having their digit pins 103 restored during the cycle and that, near the end of said cycle, the state-controller 166 becomes disengaged from the control of the sub-total key-mechanism, and the latter becomes restored. By preventing rotation of the computing wheels, the sub-total as automatically printed by said operations remains in said computing wheels.

The items accumulated in the total-printing register may be printed in the same vertical column as the totals or sub-totals and in such case the same tappet-block 135 serves both for item printing and automatic total printing. The total-controlling tappet 208, provided in said tappet block to initiate the total-printing operation, will be ineffective at the passage of the carriage into said column for item printing because, the total-key 200 not having been operated, the upper edge of the cam-plate 206 will be out of the path of said tappet 208, see Figure 12, when the carriage enters or traverses said column for item printing and accumulating. Figure 12 further shows how an attempt to press the total-key 200 while the carriage is in said column for item printing and accumulating would be checked because the rearward swing of the cam-plate 206, which accompanies effective operation of the total-key 200, would be blocked by the total-control tappet 208. The typist is thus prevented from inadvertently bringing the total mechanism into play while the carriage is at any position in said column for item printing, it being noted that said cam-plate 206 is coextensive with said column.

Concomitantly with the automatic printing of the total from the No. 3 register, said total may be transferred to say the middle register (No. 2) of the computing base. For this purpose the total-printing-zone tappet block 135 may include, besides the total-printing control tappet 208 and the tappet 123 for selecting said No. 3 register, a tappet 123ª, for selecting the No. 2 register, as shown in Figure 11. Thus, upon operating the total-key 200, the ensuing advance of the typewriter-carriage to the highest denomination of the total-printing zone, besides having depressed the cam-plate 122, to select the No. 3 register, and the cam-plate 206 to bring the total-reading feelers 222 and interponent-plates 233 into total-printing-control position, will also have depressed the No. 2 register cam-plate 122 to connect the register bars of the No. 2 register to the universal set of denomination-jacks 110 by means of the corresponding set of couplers 118, control racks 117, and cross-blades 115. The highest-denomination register-bar 104 of the No. 2 register is thereby slightly advanced to bring its digit-pins 103 under the pin-setting bars 102. The raising of the couplers 118 for the No. 2 register into operative position will also have withdrawn the primary latch 170 for the No. 2 register, and the secondary latch 173 for the latter, which is the register represented at the left of Figure 22, will also have been withdrawn through depression of the total-printing-control cam-plate 206, so that the No. 2 register-state-controller 166 will have advanced to its extreme forward position. Since said extreme forward position of the latter state-controller 166 is to determine additive connection of the No. 2 register computing pinion-shifting frame 145 to the pinion-shifting rock-shaft 146 while the No. 3 register pinion-shifting frame 145 is connected subtractively to said rock-shaft 146 by the extreme forward movement of its own state-controller 166, the cam-slot 167 of the No. 2 register state-controller 166 is reversed relatively to that for the No. 3 register, as indicated in Figure 22. Thus extreme forward movement of the No. 2 register-state-controller 166 will shift its coupler 160 toward the right of the neutral position to connect the No. 2 register arm 154, by means of the coupler-tongue 162, to said rock-shaft 146 while the No. 3 register-coupler 160 will have been shifted to the left to connect the No. 3 register subtraction-yoke 151 to said rock-shaft 146. Upon the carriage reaching the highest denomination of the total-printing zone, operation of the carriage-spacing mechanism and numeral-type actions will proceed automatically to print the total as hereinbefore described, and said total will be indexed not only in the set of register-bars for the No. 3 register, but also in the register-bars for the No. 2 register. In the general-operator cycle which follows the printing of the last digit of the total, the No. 3 register-computing pinions will be meshed with their companion idlers 144 as hereinbefore described, but the arm 154, of the No. 2 register, being connected to the pinion-shifting rock-shaft 146, will cause operation of the latter, at the start of the cycle, to swing the No. 2 register computing pinion frame 145 downwardly about the axle 158 to mesh the No. 2 register computing pinions 108 directly with the companion register-bar racks 143. Thus, during the cycle, the No. 3 register computing pinions will be rotated subtractively to the extents of the indexed total, and will be cleared while the No. 2 register computing pinions will be rotated additively, thereby causing said total to be transferred thereto. Before the return of the register-bars and while the No. 3 register computing pinions are being withdrawn from the idlers 144, the No. 2 register computing pinions will be withdrawn from the register-bar racks 143, and, before conclusion of the cycle, the No. 2 and No. 3 register-state-controllers 166 will be restored by the cross-bar 191. The set digit-pins 103 of the No. 2 register will also be restored during the cycle. The No. 2 register may have, for the purpose of suppressing the transfer of the total thereto, a throw-off key mechanism represented in Figure 22 by its partly shown lever 360ᵃ and constructed like the sub-total key-mechanism described for the No. 3 register. Operation of said throw-off key-mechanism by its key blocks the No. 2 register-state-controller to prevent rotation of the No. 2 register computing wheels and thereby prevents said transfer of the total thereto.

Automatic printing of the total from a register in the computing base B may also cause said total to be transferred to a register 365, Figure 1, shown mounted on a truck 364, connected to the typewriter-carriage 54, for co-operation with a master-wheel mechanism 366, the latter and said register 365 being constructed, for example, as shown in U. S. Patent No. 1,971,544, to O. Thieme, dated August 28, 1934. Digit-evaluating drivers 367 for a master-wheel 368 of said mechanism 366 are connected by links 369 to the new operating levers 44 of the corresponding numeral-type actions. For transferring the automatically printed total to said carriage-register 365, the latter is located upon the carriage to traverse the master-wheel 368 while the carriage traverses the total-printing zone, and the usual switch-device 371 of said master-wheel mechanism may first be set to render the master-wheel 368 operable by the master wheel drivers 367. Thus the automatic operation of the numeral-type actions resulting from pressing the total-key 200 for printing the total from the computing-base register will, by means of said links 369, actuate the master-wheel drivers 367, and this will cause said total to be transferred to the carriage-register 365. When the carriage is to traverse said total-printing zone for item printing, and accumulating in the computing-base register, as in vertical computing, the carriage-register 365 may be silenced by setting the switch-device 371 of the master-wheel-mechanism 366 to neutral position, thereby rendering the master-wheel 368 inoperable by operation of the numeral type-actions at item printing.

The tappet block 135, at the right of Figure 10, is for a computing zone in which no total is printed by means of the automatic total-printing mechanism and such tappet block, of which there may be as many as needed on the carriage, will not be provided with the total control tappet 208. It will be seen therefore that a total cannot be printed in any work-sheet column unless the tappet block therefor is provided with a total-printing control-tappet 208 and that inadvertent automatic total printing in the wrong work-sheet column is thereby prevented. Each tappet block has a tappet-holding pin 372 removable for placing upon said tappet block such tappets 208, 123 and 117 as may be required for any computing zone.

The total-key 200 may also serve as a column-tabulating key for tabulating the typewriter-carriage to a zone having a tappet-block 135 without the total-printing control-tappet 208. Although such use of the total-key 200 for tabulating will swing the cam-plate 206 rearwardly, the latter will be idle because said tappet block 135 does not have the cam-plate-depressing total-printing control-tappet 208. The carriage-arresting upper end 209 of the stop-rod 203, operable by the total-key 200, is shown offset from the body of said stop-rod 203, in order to locate it, relatively to the stop-rod 91 of lowest denomination, at the highest denomination of the total-printing zone, the body of said stop-rod 203 being at the highest denomination of the lesser item printing range of denominations.

The total-key 200 may be operated repeatedly to bring the carriage to a total-printing zone, by tabulating the carriage past one or more preceding item-printing zones for each of which there is a tappet-block 135 without the total-printing control-tappet 208. Since it may be desired at said total-printing zone to print the total without clearing the register, and since therefore the sub-total-key 352 may be operated before any one of the successive total-key tabulating operations, and, further, since the carriage in traversing any one of said preceding zones would ordinarily operate the cycling trip lever 323 and thereby, through the resulting cycle, cancel the effect of operating the sub-total-key 352, said cycle-tripping lever 323 is silenced by operation of the total-key 200.

For this latter purpose the universal bar 95, displaced by the stop-rod 203 at operation of the total-key 200 has an arm 373, Figure 1, connected to the fulcrum-rod 324 of the cycle-tripping-lever 323. Thus at operation of the total-key 200 and consequent operation of the universal bar 95, the latter acts through said arm 373 to move said fulcrum-rod 324 rearwardly, and thereby bring said cycle-tripping lever 323 into the path of a clearance notch 373a of the tappet-block and thereby away from the extension 93a, which would otherwise be capable of actuating said trip-lever 323. Upon restoration of the universal bar 95 by release of the total-key 200, the usual universal-bar return-spring, not shown, acts to return said tripping lever 323 with its fulcrum-rod 324 to the normal Figure 1 position.

A manually operable typewriter-carriage spacing-key 376, Figures 1 and 2, connected to a rockshaft 377 of the typewriter by arms 378, may rock the carriage-spacing draw-link 272 into mesh with the power-shaft 37. Said space-key rock-shaft 377 may have an arm 379 arranged to so rock said carriage-spacing draw-link 272, upon depression of said space-key 376 which may be restored by spring 380 acting on said arm 379.

The dog 36, pivoted to each draw-link 32 or 272, is slotted, as at 383, Figure 17, to straddle the draw-link, and to form a corner 384 which stops against an edge 385 of the draw-link to limit the rotation of said dog 36 about its pivot 264, said rotation preceding the power-shaft driven rearward movement of the draw-link. A tail 386 of the dog 36 coacts with the leg 82 of the angle-member 80 to stabilize the engagement of said dog 36 with the power-shaft 37 at the initial portion of the rearward movement of the draw-link. At the forward movement of the draw-link after its disengagement from the power-shaft, said tail 386 coacts with said angle member leg 82 to rotate the dog 36 back to its normal position.

The typewriter has fastened to each side of its base by screws 374, Figures 1 and 2, one of the plates 342, by means of which said typewriter rests upon the cross-bars 252, 306 of the computing base framework and is secured by screws 363, Figure 1, and dowels 363a, Figure 2. The cam-plate housing 124 is supported by brackets 375 of the typewriter framework, and by a plate 381 attached to the stop-rod housing 92. Said plate 381 with a companion plate 382, Figure 10, guides the upper ends of the stop-rods 91, 203, said stop-rods also being guided by slots 407 therein, Figure 1, and a cross-rod 362 of said housing 92.

Slotted side guides 387 of the housing 124 guide the cam-plates 122, 178, 206, each side-guide 387 having an elongated guide-notch 388 to permit the cam-plate 206 to swing about the lower cam-plate guide-means 207. The slides 125, 179 and 210, companion to said cam-plates, work in slotted upper and lower guides 394 of said housing 124; the latter also having a slotted guide-plate 389, Figure 1, for the denomination and secondary jacks 110, 289 and 290. The slide 179 has two tabs 390 engaged respectively by the total-control cam-plate 206 and the subtraction-control cam-plate 178. The thrust-rods 126, 180 and 211 companion to the slides 125, 179 and 210 are guided by plates 391 supported by arms 392 of the cross-bar 306 of the computing base framework. Said arms 392 also support guide-plates 393 for the rods or links 112, 295 companion to the jacks 110, 290. The housings 92, 124 afford respectively a guide plate 401 and a guide socket 403 for the thrust link 205 of the total-key train.

The register-bars 104 work in slotted guides 395 supported by the register-flanking plates 258, Figure 1, attached to cross-bar 396, and in slotted plates 397, attached to cross-bar 398, said cross-bars 396, 398 being part of the computing-base frame. Figure 22 also shows said plates 258. The cross-bar 398 also supports a frame 399 for the assemblage of master and register control racks 114, 117, cross-blades 115, and coupler-raising bails 120, Figure 3. The arms of each coupler-raising bail 120 also support a cross-rod 400 extending over the couplers 118 to insure restoration of the latter. The typewriter may be lifted off the computing base upon removing the screws 363; the jacks 110, 290, the slides 125, 179, 210 and the numeral-type-action levers 265, 266 being liftable, with the typewriter, from their companion parts of the computing base. Keys 402 other than the numeral-keys 30 of the typewriter-keyboard are shown in Figure 1.

With all the computing wheels of a set standing at "0", and with each spring pressed detent 228 consequently entered farther into the detent disks 227 than for any digit position from "1" to "9" by reason of greater depth of the "0" detent notches 406, the usual spring pressed cross-bar 404, abutting the row of detents 228, will have moved away from a member 405, Figure 14, to thereby, in known manner, permit printing of a clear sign by one of the typewriter-types.

The operation of the machine for automatic total-printing will be clear from the foregoing detailed description and may be summarized as follows.

Upon pressing the total-key 200 the carriage may advance toward a total-printing zone for which there is provided a tappet-block 135 having the total-printing control-tappet 208 and the tappet 123, for selecting the total-printing register. The total-reading-feelers 222 having been released by means of said tappet 208 and the companion train including the cam-plate 206 as the carriage is arrested by means of the total-key-raised stop-rod 203, the total-key 200 is released, causing the carriage to settle at the highest denomination of the total-printing zone. The resulting slight advance of the highest denomination-register bar 104 will have caused, through the interponent plate 233, the type-selector 230, and one of the digit-blades 231, either the carriage-spacing draw-link 272 of of a type-action draw-link 32 to be connected to the power-shaft 37. If the carriage-spacing draw-link 272 is connected to said power-shaft because of a non-significant "0" in the computing wheel at said highest denomination the carriage will be spaced to the next denomination at which the carriage-spacing operation will be repeated if the computing wheel at said next denomination also registers a non-significant "0". Should the computing wheel at the next (3rd) denomination, for example, register the first significant figure the resulting automatic operation of the corresponding numeral type-action will disconnect the "0"-lever 266 from the carriage-spacing draw-link 272 and connect it to the "0" type-action draw-link 32 by shifting the rock-shaft 271 and its supporting cross-slide 310. The automatic total-printing then proceeds digit by digit and following the printing of the last digit the machine is cycled, a cycle being initiated automatically by means of the tappet 93ᵃ, or manually by means of the key 314, Figure 1. During said cycle the advancing register-bars 104, indexed by means of the pins 103, may or may not cause subtractive rotation of the computing wheels of the total-printing register (No. 3) to clear the latter, and additive rotation of the No. 2 register. The No. 2 register wheels will be rotated additively to transfer the printed total thereto provided the total-printing-zone tappet-block 135 also includes a tappet 123 for that register and provided further that the throw-off key-mechanism for the No. 2 register was not operated to silence its state-controller 166. Operation of the sub-total key 352 for the total printing or No. 3 register will prevent rotation of the computing wheels for that register. The sub-total may also be transferred to the No. 2 register provided the tappet-block 135 has a No. 2 register-selecting tappet 123. Concomitantly with automatically printing the total the latter may also be transferred to the carriage-carried register 365. Automatic printing of the total in the wrong column is prevented, because total printing in a column depends on the tappet block therefore having a total-printing control-tappet 208. It will be seen that the automatic total-printing mechanism and associated register-selecting and zone-control devices may be applied for a wide range of useful and novel computing conditions and that the described mechanism provided therefor is reliable in operation.

It will be seen that a single power mechanism or operator, represented by the single snatch roll 37, constitutes the sole power medium employed to operate the digit types either, under ordinary-printing control of the type keys 30, 31 or under total-printing control of the computing mechanism.

Variations may be resorted to within the scope of the invention, and portions of the improvements may be used without others.

Having thus described my invention, I claim:

1. In a combined typewriting and computing machine, the combination of a platen, digit-types and a letter-feeding carriage coacting with said types, a register, total-taking mechanism, conditionable to co-operate with said register and carriage, to select the digit-types and to actuate the selected types seriatim by power to print the total standing in said register, said mechanism including a device operable to condition said mechanism preparatory to its operation for total-printing, a total-printing-control tappet on said carriage, and a key operable to determine operation of said conditioning device by said tappet when the carriage is advanced to a zone for which said tappet is located, means being provided whereby said tappet is ineffective to operate said conditioning device when the carriage is advanced to said zone, unless said key is operated.

2. The invention as set forth in claim 2, inclusive of a further device whereby operation of said conditioning device by said tappet depends on operation of said key before advance of said carriage to said zone, and whereby, after the carriage has been advanced to said zone, said key is ineffective to cause operation of said conditioning device by said tappet.

3. A combined typewriting and computing machine having a platen, digit-types, a letter-feeding carriage coacting with said types, a set of computing wheels, a set of indexable drivers for said wheels, said wheels being shiftable as a group for engaging said drivers for subtraction, a cycling operator for said drivers, state-controlling means adjustable to enable said cycling operator to shift said wheels for subtraction, indexing mechanism, including denominational driver-shifting trains controlled by said carriage, for indexing said drivers seriatim preparatory to a cycle, said drivers being normally disconnected from said trains and being connectible thereto for the purpose of calling said computing wheels into use, type-actuating means operable by power, digit-devices selectively operable to effect actuation of said types by said type-actuating means, denominational selectors differentially positionable, under control of said computing wheels, to select the digit-devices corresponding to the total standing in said wheels, said selectors being movable, from a retracted position, to engage digit-spirals on said wheels, means acting through the shifts of said drivers as effected by said denominational trains, to operate the selected digit-devices, and thereby cause operation of the corresponding digit-types by said type-actuating means to print said total, tappet-means on the carriage, a plurality of control devices co-operative with said tappet-means to cause said selectors to move into engagement with said computing wheels, to connect said drivers to said denominational trains, and to adjust said state-controlling means, and means whereby said cycling operator retracts said selectors from said computing wheels before the latter are shifted in the cycle.

4. A combined typewriting and computing machine having a platen and including, in combination, a set of digit-types and a letter-feeding carriage coacting with said digit-types, a set of computing pinions, denominational drivers for said computing pinions, digital and denominational driver-indexing mechanism operative concomitantly with said digit-types and carriage, a cycling operator for said drivers, a total-key, tabulating mechanism operable by said total-key to tabulate said carriage to a total-printing zone, a total-taking control movable with said carriage, normally ineffective means conditionable preparatory to printing the total, to read the total in said computing pinions and concomitantly effect selection of the corresponding digit-types, a device operated concomitantly with said total-key to enable said total-taking control to condition and render effective said total-reading and type-selecting means concomitantly with tabulating the carriage to said zone by means of said total-key, and means causing automatic actuation of the selected digit-types and carriage to ensue upon said total-reading and type-selecting means being rendered effective as aforesaid, to print the total digit by digit on said platen; whereby the total may be automatically printed only in said total-printing zone, and operation of the total-key with reference to other zones is ineffective.

5. A combined typewriting and computing machine having a platen and including, in combination, a set of digit-types, a letter-feeding carriage coacting with said digit-types, a set of computing pinions in which an amount is entered as a result of operating said digit-types and carriage, means to read said computing pinions for the total and to concomitantly preselect the corresponding ones of said digit-types, means, including denominational elements operable seriatim by said carriage, to operate the selective digit-types by power, a key operable to tabulate said carriage to a total-printing zone, and a device operated by said key to render it engageable by the carriage, said device being then operated by said carriage, as the latter reaches said zone, to cause said total-reading, type-selecting and digit-type-operating means to co-operate under control of said computing pinions and carriage to print the total, said carriage having tappet-means to engage said denominational elements and said device.

6. A combined typewriting and computing machine having a platen and including, in combination, a set of digit-types and a letter-feeding carriage coacting with said digit-types, a set of computing pinions, indexable denominational drivers for said computing pinions, a cycling operator for said drivers, normally ineffective means engageable to read the total in said computing pinions and select the corresponding digit-types, a key, tabulating mechanism operable by said key to release said carriage and arrest its resulting advance at a total-printing zone, a tappet moving in unison with said carriage, means, conditioned by operation of said key, to enable said tappet to engage and thereby call into use said total-reading and type-selecting means preparatory to total-printing as the carriage reaches said total-printing zone, and means causing actuation of said types to print said total to follow the calling into use of said total-reading and type-selecting means by means of said tappet; whereby items and their total may be printed in the same vertical column, and said tappet is normally ineffective to cause actuation of said types when the carriage traverses the zone for said column for item-printing.

7. A machine constructed according to claim 6, said tappet being capable of interfering with said total-key conditionable means to thereby prevent engagement, of said total-reading and type-selecting means, resulting from untimely pressing of said key, that is, when the carriage is in said zone for item-printing.

8. The combination of digit-keys, digit-types, a platen, a denomination-feeding carriage coacting with said digit-keys and digit-types, a set of computing wheels, drivers for said computing wheels, a cycling operator for the drivers, means, including denominational trains traversed and operated by said carriage, enabling operation of said digit-keys at a computing zone of carriage travel to cause said drivers to be indexed seriatim, preparatory to a general-operator cycle, and total-printing mechanism operable under control of said computing wheels, carriage and denominational trains, to select and actuate the appropriate ones of said digit-types to automatically print the total registered in said computing wheels, said automatic total-printing mechanism including a total-taking control operable, aside from said denominational trains, to predetermine engagement of said total-printing mechanism, and also including a tappet-device enabling said carriage at a predetermined zone to determine and effect operation of said control to bring said total-printing mechanism into play, whereby operation of said total-printing mechanism to print the total is limited to said predetermined zone.

9. A combined typewriting and computing machine having digit type-actions, a carriage, carriage-feed mechanism operable by or independently of said type actions, a power-shaft, mechanical-power transmitting connectors individually operable for connecting any type-action, or the carriage-feed mechanism alone, to said power-shaft for resulting actuation of the type-action or carriage-feed mechanism, a set of computing wheels, and wholly mechanical total-printing mechanism including selecting-means controlled by said computing wheels to select said connectors for determining their operation according to the total standing in said computing wheels, said means including a device adjustable so that a computing wheel registering "0" may effect selection either of the connector for the "0" type-action or the connector for the carriage-feed mechanism, said total-printing mechanism also including means mechanically actuable by said carriage and adapted for operating the selected connectors mechanically through said selecting-means in denominational order, starting with the highest denomination of the total-printing zone, and means operative to effect adjustment of said device, preparatory to printing a total, to determine operation of the connector for the carriage-feed mechanism at each non-significant figure-denomination, said device being adapted to be also adjusted, concomitantly with actuation of the type-action for the first significant figure, to determine operation of the connector for the "0" type-action for any "0" after the first significant figure.

10. A computing machine having, in combination, a platen, a set of digit-types, a letter-feeding carriage coacting with said types, a register-mechanism, including a set of computing wheels, operable to register amounts in said wheels, mechanism operable for selectively actuating said digit-types by power to print in co-operation with said carriage, total-taking means pre-settable preparatory to printing a total to enable said computing wheels to effect a selection of said types according to the total standing in said wheels, and to concomitantly enable the carriage at a total-printing zone to effect, in denominational order, the actuation of the selected types by means of said type-actuating mechanism, a tappet moving in unison with said carriage, and means engageable with said tappet at the advance of the carriage to a total-printing zone, to pre-set said total-taking means to determine total-printing at said zone.

11. Machine constructed according to claim 10, inclusive of a total-key operable to render said last-mentioned means engageable with said tappet at said zone, said last-mentioned means and tappet being constructed so that the advance of the carriage to said zone is normally ineffective to cause engagement of said last-mentioned means and tappet.

12. In a machine of the character described having a platen, a set of digit-types, a letter-feeding carriage coacting with said types, mechanism for actuating said types selectively by power, a set of computing wheels, indexable denominational drivers therefor, a cycling operator for said drivers, and indexing mechanism co-operative with said carriage to index said drivers in denominational order preparatory to a cycle of said operator, said carriage acting at the indexing operation to shift said drivers seriatim into position for indexing; the combination of a total-key, type-selectors, means conditionable by said total-key and operable by the carriage, at a total-printing zone, when so conditioned to cause said selectors to become, under control of said wheels, differentially positioned from normally retracted positions to select the types corresponding to the total standing in said wheels, elements interposed, concomitantly with operation of said means, between said drivers and type-selectors to enable the seriatim shifts of said drivers to operate said type-selectors for effecting actuation of the selected types by said type-actuating mechanism, and means operated by said operator, during a cycle following said type-actuation, to restore said type-selectors and interposed elements.

13. In a combined typewriting and computing machine having a platen, the combination of a set of computing wheels, digit-types, a letter-feeding carriage coacting with said types, total-taking mechanism, controllable by said computing wheels and carriage, for selectively actuating said digit-types by power to print the total registered in said wheels, said total-taking mechanism being conditionable for predetermining its control by said computing wheels and carriage, a key operable for tabulating said carriage to different zones, a total-zone-defining tappet moving in unison with said carriage, and means conditioned by said key for control by said tappet incidentally to tabulating the carriage to said total-zone, and operating when so conditioned and controlled to condition said total-taking mechanism preparatory to total-printing at said total-zone.

14. In a combined typewriting and computing machine having a platen, the combination of a set of computing wheels, digit-types, a letter-feeding carriage coacting with said types, mechanism, controllable by said computing wheels and carriage, for selectively actuating said digit-types by power to print the total registered in said wheels, said mechanism including a device settable, preparatory to printing a total, to render said mechanism controllable by said wheels and carriage, a total key, and a tappet, movable in unison with said carriage, operative, depending on operation of said total-key, for a predetermined zone of carriage travel for effecting setting of said device preparatory to total-printing at said zone.

15. The combination of a set of computing wheels, a set of feelers projectable from normal wheel-clearing positions to engage and mechanically read said wheels for certain total-printing operations, a carriage, a total key, and means conditioned by said total-key and operative under control of said carriage at a certain zone of carriage travel when so conditioned to project said feelers, thereby to restrict the total-printing to said zone.

16. In a combined typewriting and computing machine having a platen, the combination of digit-types, a letter-feed carriage coacting with said types, a register operable for adding and subtracting, a state-controller for said register, total-taking mechanism conditionable to operate, under control of said register and carriage, for selecting and actuating said digit-types to print the total standing in said register, a total-key, a total-taking-control tappet on said carriage, and means co-operative, under control of said key, with said tappet for a predetermined zone of carriage travel to predetermine total-taking and register-clearance, said means including a device engageable, under control of said key, by said tappet, to condition said total-taking mechanism for an ensuing total-printing operation, said means also including a device operated concomitantly with said tappet-engaged device to operate said state-controller to determine subtractive operation of said register, to clear the latter in conjunction with said total-printing operation.

17. In a device for mechanically ascertaining for a total-printing operation the digital position of a computing wheel; a spring-pressed feeler, and an element connected to rotate with said wheel and engageable by said feeler, said feeler being adjustable to different digit-stations for co-operating in said total-printing operation and being normally withdrawn from said element, said element having, for adjusting the feeler, notches of different digital depths, spaced therearound, and each notch extending substantially eccentrically from the rotation center of said element, whereby the different digit-stations of the feeler against stop-forming bottoms of the successive eccentric notches are distinctly spaced but the spring-pressed feeler tends to rotate said element and wheel, each notch having a side to engage the spring-pressed feeler to prevent said spring-pressed feeler, as it bears against its notch bottom, from rotating said element and wheel.

18. In a combined typewriting and computing machine having digit type-actions forming part of a typewriter, said typewriter also having a letter-feeding carriage and a platen, and a set of computing wheels forming part of a computing base surmounted by said typewriter; a total-printing mechanism including, in combination, a power-shaft incorporated in said typewriter, a connector for each type-action movable into engagement with said power-shaft for a resulting printing stroke of the type-action, means acting during the printing stroke to disconnect the connector from the power-shaft in time for free recoil of the type-action independently of the power-shaft, a set of total-reading bars mounted in tandem with the computing wheels to move endwise to engage stops provided on the latter and thereby assume total-reading positions, a series of transverse individually movable digit-blades contiguous to said total-reading bars and operatively connected to said connectors, each total-reading bar mounting a lever forming a selector which, at each digit-reading position of said bar, is operatively connected to the corresponding one of said digit-blades, for registering selection of the corresponding digit type-action, and means, acting through said selectors and digit-blades and under control of said carriage, to cause said connectors to engage said power-shaft to effect printing of the amount standing in said computing wheels.

19. In a machine of the character described having a set of digit-types, a letter-feeding carriage co-operative with said types, and a plurality of sets of computing wheels; a total-printing mechanism including, in combination, means conditionable to operate under control of one of said sets of wheels to effect a pre-selection of said digit-types according to the total in said one set of wheels, a conditioning-jack operable to condition said means, a series of jacks, one for each denomination of said wheels, means operative under control of said series of jacks for operating the selected types in denominational order by power, said last-mentioned means being normally disconnected from said series of jacks, the latter also forming part of a denominational indexing mechanism common to all the sets of computing wheels, a connector-jack operable to connect said last-mentioned means to said series of jacks, and a tappet-unit located on the carriage for appropriately operating the connector-jack, the conditioning-jack and the denominational series of jacks at a predetermined total-printing zone of the carriage.

20. In a combined typewriting and computing machine having a platen, digit-types, a letter-feeding carriage co-operative with said types, a set of computing wheels, and indexing mechanism associated with said wheels and including a set of denominational jacks traversed by said carriage; a total-taking mechanism conditionable for operation under control of said wheels to select said digit-types and under control of said carriage by means of said denominational jacks to operate the selected types to print the total standing in said wheels, said total-taking mechanism including a total-key, and a tabulating mechanism operated by said total-key for tabulating the carriage to a total-printing zone, and also including a total-taking jack conditioned concomitantly with operation of said total-key so as to be operable by said carriage to condition said total-taking mechanism as said carriage is tabulated to said zone, said carriage having a tappet for engaging said total-key conditioned total-taking jack and also having a tappet for engaging the aforesaid denominational jacks seriatim.

21. In combination, a platen, a set of digit types, a letter-spacing carriage co-operative with said types, a series of computing wheels, a power-driven universal mechanical type operator, type selectors, one for each wheel, adjustable under control of said wheels and operative according to the adjustment to effect for total-printing a mechanical selection of types according to the angular positions of all the wheels, a denominational series of devices, one for each wheel, engageable seriatim by the carriage for mechanically inducing connection of the type selected by each wheel to said power operator, and means operative mechanically at each total-printing operation and effective when the total is of a less number of denominations than the number of computing wheels and the carriage nevertheless traverses all of said denominational devices, to determine connection to said operator, of only the types for the first significant figure and succeeding lower figures of such total, whereby the typing of a spurious figure from any wheel above said first significant figure is prevented.

22. The combination with a set of computing wheels, digit-types, a carriage, and a letter-space mechanism for the carriage co-operative with said types and also operable independently of said types, of a total-printing mechanism including a set of digit-devices forming part of a type-selecting mechanism, a denominational set of selectors also forming part of said type-selecting mechanism and adjustable under control of said wheels to select said digit-devices in accordance with the angular positions of all the wheels, means operable by the carriage to displace the selected digit-devices in denominational order, a universal mechanical operator for the types and escapement-mechanism, and means operative in response to the carriage-controlled displacement of said digit-devices to connect the appropriate digit-type or the escapement-mechanism to said universal operator, said last-mentioned means including a device operative to determine connection of the escapement-mechanism alone to said mechanical operator at denominations at which the wheels register a non-significant figure as when the total is for a less number of denominations than the number of computing wheels.

23. In a total-printing mechanism, the combination of a set of denominational computing wheels, a set of digit-types and individual operators therefor, a letter-feeding carriage co-operative with said digit-types and operators, type-operator controllers actuatable to cause operation of said type operators and adapted to be selectable under control of said computing wheels to select the type-operators which correspond to the total-registering angular positions of the computing wheels, means adapted to be operable under control of the carriage to operate the selected type-operator controllers seriatim beginning with the type-operator controller selected for the computing wheel of highest denomination, one of said type-operator controllers corresponding to a computing wheel angular position, which may be of non-significant value depending on whether the computing wheel which selects said one type-operator controller is of higher denomination than the wheel which registers the first significant figure of an amount, means conditionable to couple and uncouple said one type-operator controller and its type operator, means determining that, while said highest wheel and succeeding wheels register a non-significant figure and said one type-operator controller is consonantly selected and actuated, said coupling means will be conditioned to uncouple said one type-operator controller and its type operator, provision being made whereby operation of said one type-operator controller without its type operator is effective to space said carriage, thereby to automatically space said carriage to the denomination of the wheel which registers the first significant figure, and means acting at the printing of said first significant figure to condition said coupling means to again couple said one type-operator controller and its type operator.

24. The combination of a set of denominational computing wheels, a set of digit-types and a co-operative letter-feeding carriage, a device operable for letter-feeding the carriage without printing, a total-key operable to tabulate said carriage to an ultra-denomination position corresponding to the highest one of said wheels and from which the carriage may proceed to the denomination of the next highest computing wheel, mechanisms conditionable by said total-key so as to be operated by means of said carriage at said ultra-denomination position to register a selection of the digit-types corresponding to the angular positions of the computing wheels succeeding said highest wheel and under control of the highest denomination wheel, to operate said carriage-feeding device to bring said carriage from said ultra-denomination to the next highest computing wheel denomination, and means, including denominational devices, whereby the carriage at said next highest computing wheel denomination causes either a printing operation of the digit-type selected for said next highest computing wheel denomination or an operation of said carriage-feeding device without printing, depending on whether or not said highest wheel registers a significant figure, the carriage, in either case, becoming stepped to the next denomination, said denominational devices enabling said last-mentioned means to serve similarly, as recited, at said next denomination and at each succeeding denomination.

25. In a total-printing mechanism, the combination of a set of denominational computing wheels, a set of digit-types and individual operators therefor, a letter-feeding carriage cooperative with said digit-types and operators, a total key, type-operator controllers actuatable to cause operation of said type operators and adapted to be selectable under control of said computing wheels, consequently to operation of said total key, to select the type-operators which correspond to the total-registering angular positions of the computing wheels, means adapted to be operable under control of the carriage to actuate the selected type-operator controllers seriatim beginning with the type-operator controller selected for the computing wheel of highest denomination, mechanical means effective, when said highest wheel and succeeding wheels register a non-significant figure, to determine that the corresponding type-operator controller, selected by means of said highest and succeeding wheels, is ineffective, when actuated under control of said carriage, to cause printing of said non-significant figure, and mechanical means responsive to actuation of said non-significant figure type-operator controller without printing to space said carriage automatically to the denomination of the wheel which registers the first significant figure.

26. In a total-printing mechanism, the combination of a set of denominational computing wheels, a set of digit-types and individual operators therefor, a letter-feeding carriage cooperative with said digit-types and operators, a total key, type-operator controllers actuatable to cause operation of said type operators and adapted to be selectable under control of said computing wheels, consequently to operation of said total key, to select the type-operators which correspond to the total-registering angular positions of the computing wheels, means adapted to be operable under control of the carriage to actuate the selected type-operator controllers seriatim beginning with the type-operator controller selected for the computing wheel of highest denomination, mechanical means effective, when said highest wheel and succeeding wheels register a non-significant figure, to determine that the corresponding type-operator controller, selected by means of said highest and succeeding wheels, is ineffective, when actuated under control of said carriage, to cause printing of said non-significant figure, mechanical means responsive to actuation of said non-significant figure type-operator controller without printing to space said carriage automatically to the denomination of the wheel which registers the first significant figure, and mechanical means operable in a wholly mechanical way at the printing of said first significant figure to determine automatically that subsequent operation of said type-operator controller shall be effective to cause printing.

27. In a machine of the character described, the combination of a type operator, a carriage, a carriage feed mechanism actuatable concomitantly with said type operator, an operator for said carriage feed mechanism actuatable independently of said type operator, a power driver, a computing wheel, a mechanical device operable by means of said carriage under control of a certain position of said wheel, and mechanical coupling means differentially conditionable to enable said device to determine operation of one or the other of said operators by said driver.

28. In a machine of the character described having digit-type operators and a carriage cooperative with said operators, the combination with a computing wheel, of a feeler tending to move into wheel reading position against a spiral of digit stops on said wheel, trippable means normally keeping said feeler retracted from said spiral, a manually operable key, and means dependent on cooperation of the carriage at a predetermined position of the latter to enable said key to trip said trippable means to release said feeler for consequent movement to a wheel reading position on said spiral.

29. In a machine of the character described having digit-type operators and a carriage cooperative with said operators, the combination with a computing wheel, of a feeler tending to move into wheel reading position against a spiral of digit stops on said wheel, trippable means normally keeping said feeler retracted from said spirals, and means dependent on cooperation of the carriage at a predetermined position of the latter to trip said trippable means to release said feeler for consequent movement to a wheel reading position on said spiral, said last mentioned means including a tappet movable with the carriage, a total key, a jack operatively connected to said total key so as to be rendered operable by said tappet only on operation of said total key, and a connection through which said jack, when operated, trips said trippable means.

30. The combination with a set of numeral-types of a typewriter, a computing-wheel and a drive-rack for said wheel, of a type-selector normally in retracted position but positionable against a digit spiral provided on said wheel to select a type corresponding to the angular position of the wheel, said selector then being operable to effect actuation of the selected type, an interponent normally in retracted position but positionable to operatively connect said selector and rack, said rack being then displaceable to operate the type selector through said interponent to effect actuation of the type, and a member operatively connected to and normally retaining both said selector and interponent in ineffective positions and operable to release said selector and interponent jointly, said selector and interponent tending to move to effective positions.

31. In a combined typewriting and computing machine, the combination of digit-keys, digit-types, a platen, a letter-feedable carriage, a single power-operated universal driver for said types, type-actuating devices, one for each type, selectively connectible under control of said keys to said driver for actuating said types to print by power, a set of computing-wheels, means operable substantially concomitantly with the key-controlled power-actuation of said types for determining entry of amounts in said wheels, and means selectable under control of said wheels and actuable by said carriage for connecting said type-actuating devices to said driver to print digit-by-digit the total standing in said wheels, said driver being the sole power-driven medium employed determinately in association with said last-named means to effect the total-printing actuation of said types.

32. In a combined typewriting and computing machine, the combination of digit-keys, digit-types individually operable in printing and automatic return strokes, a platen, a letter-feedable carriage, a set of computing-wheels, a single power-operated universal driver, devices, one for each type, selectable by said digit-keys to cooperate with said driver to impart a printing stroke to the corresponding type, means operable substantially concomitantly with such operation of the types to determine entry of an amount in the wheels, means operable under control of said wheels to effect a selection of said devices, and means operable by the carriage to enable the wheel-selected devices to cooperate with said driver to operate the types for printing the total digit-by-digit and permitting automatic return of the types, said driver being the sole power-driven medium employed determinately for effecting total-printing operation of said types.

33. The combination with computing wheels, digit-type actuators, a platen, a letter-feedable carriage, and means operable substantially concomitantly with said type actuators to determine entry of an amount in said wheels, of a single power-operated universal driver for said type-actuators, coupling devices associated with said actuators and individually operable to connect their corresponding actuators to said driver, digit-keys operable selectively to operate corresponding coupling devices, and members operable selectively under control of said computing wheels and actuatable by said carriage to operate said coupling devices for effecting total-printing, said coupling devices having operative connections to said type-keys and to said members, said operative connections being arranged so that said coupling devices are operable either by said type-keys or by said members, said single driver being the sole power medium employed determinately for effecting actuation of said type actuators.

34. The combination with a digit-type, a letter-feedable carriage cooperable with said type, and a computing wheel, of a type-operating lever having an operating arm-end movable rearwardly and forwardly of the machine to rock said lever, means operable concomitantly with said lever to determine entry of the digit in said wheel, a single rotary power driver behind said operating arm, a connector lever fulcrumed on said operating arm-end and having an arm extending rearwardly from the fulcrum to said driver, said latter arm being operatively connectible to said driver by rocking said connector lever about its fulcrum, said connector lever having an arm extending forwardly from said fulcrum, a type key having an operative connection to said forward arm of the connector lever for rocking the latter for connection to said driver upon operation of said key, another lever having an arm operatively connected to said connector lever, and means selectable under control of said computing wheel and actuatable by said carriage to actuate said other lever, depending on said wheel standing at said digit, whereby to rock said connector lever into operative connection with said driver for actuating the type to print said digit, said single driver being the sole power medium employed in association with said last-named means.

HENRY L. PITMAN.

CERTIFICATE OF CORRECTION.

Patent No. 2,258,714.　　　　　　　　　　　　　October 14, 1941.

HENRY L. PITMAN.

It is hereby certified that error appears in the printed specification of the above numbered patent requiring correction as follows: Page 13, first column, line 63, claim 2, for the word and numeral "claim 2" read --claim 1--; and that the said Letters Patent should be read with this correction therein that the same may conform to the record of the case in the Patent Office.

Signed and sealed this 2nd day of December, A. D. 1941.

Henry Van Arsdale,
Acting Commissioner of Patents.

(Seal)